United States Patent [19]

Moore et al.

[11] Patent Number: 5,294,989
[45] Date of Patent: Mar. 15, 1994

[54] SATURABLE SMOOTHING GRID FOR IMAGE PROCESSING

[75] Inventors: Andrew J. Moore; John Allman, both of Pasadena, Calif.

[73] Assignee: Moore Color, Inc., Pasadena, Calif.

[21] Appl. No.: 761,427

[22] Filed: Sep. 17, 1991

[51] Int. Cl.$^5$ .................. H04N 5/213; H04N 5/335; G06K 9/40

[52] U.S. Cl. .................. 348/241; 382/54; 348/242; 348/607

[58] Field of Search ............ 358/27, 50, 36, 167, 358/213.15; 382/54, 22

[56] References Cited

U.S. PATENT DOCUMENTS

| | | | |
|---|---|---|---|
| 4,384,366 | 5/1983 | Frankle et al. | 358/160 |
| 4,517,600 | 5/1985 | Reitmeier | 358/36 |
| 4,689,666 | 8/1987 | Hatanaka | 358/36 |
| 4,736,439 | 4/1988 | May | 358/167 |
| 4,783,840 | 11/1988 | Song | 382/54 |
| 4,786,818 | 11/1988 | Mead et al. | 358/213.11 |
| 4,805,031 | 2/1989 | Powell | 358/167 |
| 4,807,033 | 2/1989 | Keesen et al. | 358/36 |
| 4,858,013 | 8/1989 | Matsuda | 358/167 |
| 4,962,542 | 10/1990 | Klees | 358/167 |
| 4,969,043 | 11/1990 | Pothier | 358/213.15 |
| 4,979,136 | 12/1990 | Weiman et al. | 358/36 |
| 5,038,388 | 8/1991 | Song | 382/54 |
| 5,050,226 | 9/1991 | Collet-Billon | 382/54 |
| 5,054,100 | 10/1991 | Tai | 382/54 |
| 5,111,285 | 5/1992 | Fujita et al. | 382/54 |
| 5,131,057 | 7/1992 | Walowit et al. | 382/54 |
| 5,144,687 | 9/1992 | Honda | 382/54 |

OTHER PUBLICATIONS

William F. Schreiber, "Image Processing for Quality Improvement", *Proc. IEEE*, vol. 66, Dec. 1978, pp. 1640–1651.

John G. Harris, Christof Koch, and Jin Luo, "A Two-Dimensional Analog VLSI Circuit for Detecting Discontinuities in Early Vision", *Science*, vol. 248, Jun. 8, 1990, pp. 1209–1211.

John G. Harris, "Continuous-Time Segmentation Networks", *SPIE*, vol. 1473, 1991, pp. 161–172.

John G. Harris, "The Tiny Tanh Network", *Analog Models of Early Vision*, Ph.D. Thesis, California Institute of Technology, Pasadena, Calif., 1991, pp. 75–95.

O. Creutzfeldt, B. Lange-Malecki, and K. Wortmann, "Darkness Induction, Retinex and Cooperative Mechanisms in Vision", *Exp. Brain Res.*, vol. 67, 1987, pp. 270–283.

Carver Mead, "Aggregating Signals", *Analog VLSI and Neural Systems*, Addison-Wesley, New York, 1989, pp. 101–124.

*Primary Examiner*—Joseph Mancuso
*Assistant Examiner*—Wendy R. Greening
*Attorney, Agent, or Firm*—Robbins, Berliner & Carson

[57] ABSTRACT

An image processing technique in which illumination effects are reduced by subtraction of spatially weighted masks which are formed substantially simultaneously on an analog smoothing grid. Haloing are reduced by using a mask whose spatial weighting is non-linear at the boundary of image segments whose intensities differ by more than would be predicted by the Rule of Twenty which predicts that the ratio of naturally found reflectances seldom exceeds a factor of twenty. A color image is processed by forming differently scaled masks, each of which is related to a spectral component of the original image. The masks are subtracted from the image to form a composite image. The saturation level in each smoothing grid is selected to minimize adverse effects of illumination in that spectral component by causing segmentation of image areas whose intensity differences exceed natural reflectance ratios. The transfer functions of each grid may also separately adjusted to enhance the composite image.

14 Claims, 12 Drawing Sheets

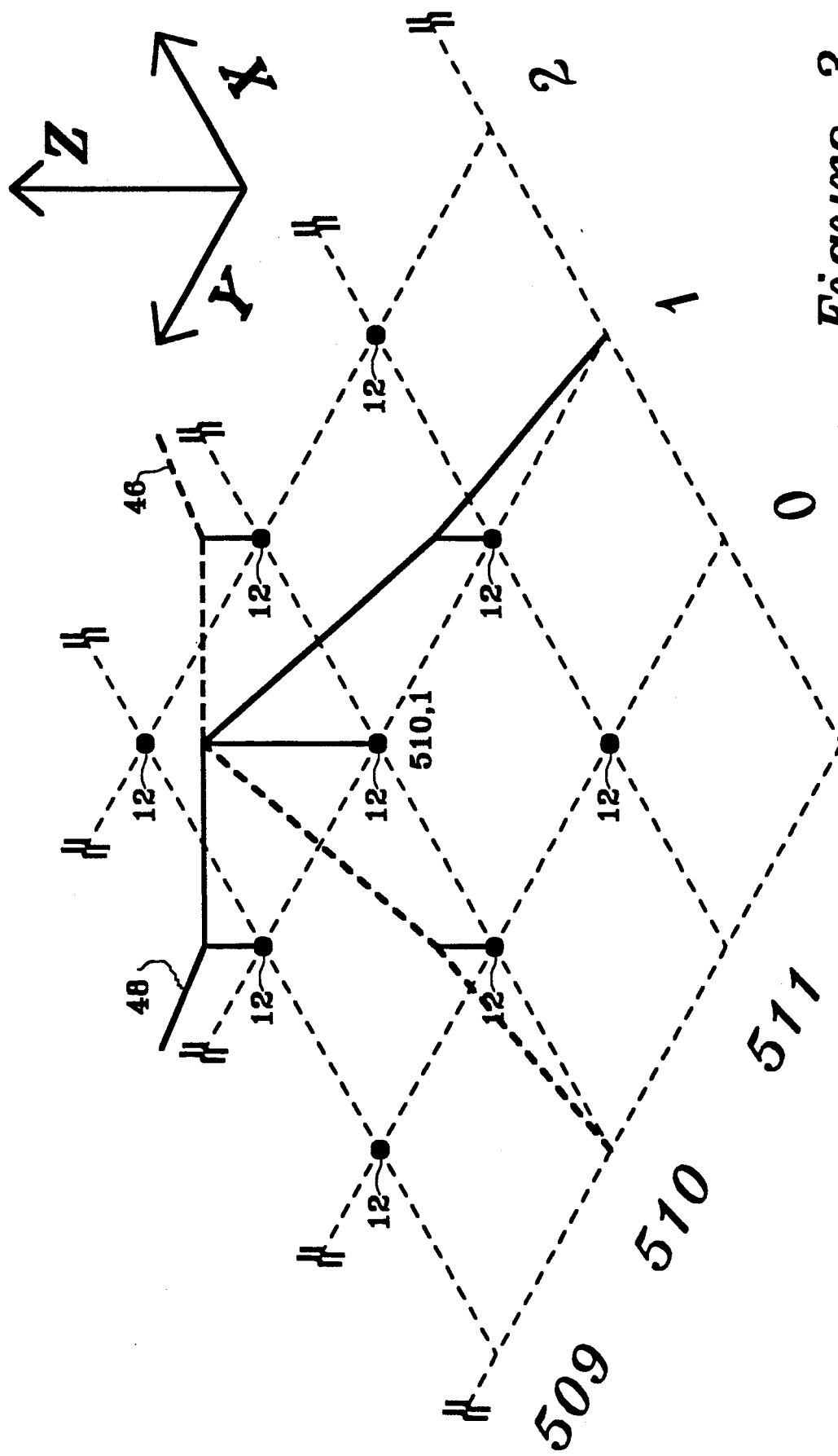

SATURABLE SMOOTHING GRID FOR IMAGE PROCESSING

BACKGROUND OF THE INVENTION

1. Field of the Invention

This invention relates to image processing and in particular to techniques for processing images captured under varying colors, and/or levels of illumination, such as video imaging systems.

2. Description of the Prior Art

Conventional image processing systems capture and reproduce images as illuminated by ambient light. That is, an image will be reproduced differently if captured under different ambient illumination conditions. Such conventional systems may have difficulty reproducing the colors, and/or levels of intensity and contrast, of an image as seen by a human observer as a result of the color of the illumination and/or varying levels of illumination in the image.

For example, the skin tones of a color image of a person photographed in midday sunlight will differ from the skin tones of a photograph of the same person taken at sunset. The ambient light at sunset includes colors which are reflected by the skin and reproduced in the skin tones by the imaging process. To a human viewer, however, the skin tones appear about the same, whether viewed at sunset or in midday sunlight as a result of automatic corrections made by the human nervous system.

The eye and brain, however, are thought to be able to perceive the approximate reflectance of objects under a variety of illuminants, colored and achromatic. These abilities are known as color constancy and brightness constancy. These constancies result from range compression, with the range maximum set by the brightest or most colorful object in a portion of the scene. As the illumination varies, the light reaching the eye from the most reflective object varies, and the range is adjusted accordingly.

It is thought that while the sensors of the eye can faithfully capture image intensities over a range of more than three orders of magnitude, the range of the optic nerve, which carries the image from the retina in the eye to the brain, is about 1.5 orders of magnitude. This view is presented, for example, by Creutzfeldt et al. in the article entitled "Darkness induction, retinex, and cooperative mechanisms in vision," Exp. Brain Res., volume 67, p. 270, 1987.

The retina must cope with a dynamic range mismatch similar to the mismatch, discussed below, of conventional artificial sensors and display media, and so must provide compensating mechanisms. Photographers and videographers who are not aware of this fact often think that there is something wrong with the camera when, in viewing the captured image, there is a strong coloration or deep shadows due to illumination not observed when the scene was being captured.

In fact, however, the brain corrected for the illumination at the time of image capture using range compression techniques, but the camera recorded the true scene and the display media could not faithfully reproduce it. Thus it has been desirable to interpose a range compression process between image capture and presentation in order to display recorded images faithfully to the human viewer, that is, to display recorded images so that they appear in the same way they appear to the viewer while being captured. This process may be called color or brightness constancy, range-matching or enhancement.

Many algorithms for determining color constancy corrections have been developed which attempt to provide information for correcting the colors at each point in a color image in response to color average information from surrounding points. In general, such algorithms dictate the reduction of a particular color at a specific point if surrounding points indicate an overabundance of that color. That is, a spatially weighted average of color is removed from each specific point.

For example, in a color image photographed at sunset, an overabundance of red would be detected and the algorithm used would indicate that the red color at each point be reduced by the addition of a determinable intensity of red's complementary color, green, at that point. The resultant corrected image would appear more like an image photographed in midday sunlight.

Conventional techniques for implementing such image color constancy correction algorithms require substantial time for the necessary mathematical calculations and therefore must be performed during post processing if at all. Although post processing may be possible for still images, conventional techniques are very tedious and time consuming and therefore little used. When used, such conventional color constancy correction systems typically require point by point color corrections. Video imaging systems require almost constant corrections and such conventional algorithm implementation techniques are not convenient for common use, even during post processing.

Known color constancy correction techniques also tend to distort images by creating noticeable halos of incorrect coloration at color transition edges. That is, because such known techniques rely on spatial color averaging techniques, sharp color changes are improperly corrected in the vicinity of the edges. For example, a red ball on a gray background will appear to have a noticeable green halo near the edge of the ball because the average color in the vicinity of the color transition will not accurately reflect, on average, the overabundance of illumination coloration.

The human central nervous system, on the other hand, compensates for colors present in the ambient illumination automatically so that skin tones, for example, appear the same to the human viewer even under vastly different lighting conditions. Further, the color constancy corrections made by the human central nervous system do not noticeably create halo distortion.

The growing use of video imaging processes increases the need for real time or near real time implementations of brightness and color constancy correction techniques and, in particular, implementations which do not noticeably distort the images.

Conventional systems have difficulty in properly reproducing images illuminated with widely varying levels of illuminations. Image sensing processes, or detectors, commonly have a greater range of sensitivity than processes that are used to present images. Paper based processes such as photographic, ink, and electrostatic printing and electronic processes that rely on cathode ray tubes—or CRTs, liquid crystal displays—or LCDs, electroluminescent displays—or ELDs, plasma displays, and etc., typically cannot produce the dynamic range in presentation that is captured by photographic systems or electronic imaging devices such as charge-coupled-devices—or CCDs, infra-red or IR devices, charge injection devices—or CIDs, and the like.

In such conventional systems, the minimum level that can be sensed is usually set by the noise level inherent in the device. The maximum level that can be sensed in a CCD camera, for example, is typically more than 3 orders of magnitude greater than the minimum or noise level of the camera. That is, there is about a factor of 1000 range of image intensities that can be sensed in a CCD camera. However, conventional video monitors used to view images detected by CCD cameras can often only display intensities covering about 1.5 orders of magnitude, that is, there is only about a factor of 30 range of image intensities that can be displayed on such monitors.

There are two particularly troublesome problems that occur with dynamic range mismatch between the image sensor and the display device, that is, when displaying an image detected with a wide-range sensor on a limited range monitor or other medium. First, since the sensor signal must be scaled down for display, the incremental contrast of the final result is often poor. Detail in the original scene is displayed at low contrast. Second, important detail may be displayed near the top or bottom of the monitor range, lost in brightness or darkness. This problem is especially obvious in scenes in which one area is much brighter than the rest of the scene.

It is well known that the reflectances of natural objects tends to vary over approximately a factor of twenty. That is, the ratio of intensities across an image due to the reflectances of the objects in the image varies from the lowest intensity to the highest intensity so that the highest intensity object is about twenty times more luminous than the lowest intensity object in the image. This physical phenomena is called herein the Rule of Twenty.

Conventional display media, such as video monitors, are often capable of displaying image intensity ranges greater than required by the Rule of Twenty, typically such monitors can display output ranges that span about a factor of thirty.

However, lighting differences across a scene often introduce a greater range of image intensities across the scene than caused by the reflectance variation. That is, image intensity is equal to the product of illumination intensity and reflectance. The range of common illumination intensities across a scene are not limited by the Rule of Twenty.

In an outdoor scene, for example, the amount of light reflected from an object that is partly lit by direct sunlight and partly in shadow may vary by a factor of 100 or more even though the portion of this range resulting from reflectance changes does not exceed the Rule of Twenty. Conventional image sensors can capture this range, but most conventional display media cannot faithfully reproduce it.

Flames, for example, will usually overload a monitor range unless the input is scaled by, for example, scaling a sensor input signal electronically, reducing the iris aperture or shortening the pixel exposure time. With the reduced sensitivity of the sensor input, though, it is hard to see more than a silhouette of what is burning. Important details such as numbers on a burning vehicle, for example, may be lost in darkness.

In this example, the flames and vehicle numbers are separated in intensity by substantially more than one or 1.5 orders of magnitude. The flames and vehicle number may therefore not be simultaneously displayed on a monitor having a display range of only about 1.5 orders of magnitude between the brightest and darkest portions of the displayed image.

A well known photographic darkroom technique called dodging has long been used to cope with the dynamic range mismatch between a film negative and the photographic print paper. If a photographic negative of an image including a full-range of intensities is printed without special processing, some image portions may be printed as too bright or too dark, depending on the exposure time used in making the print. If the print is too dark in places and the exposure is shortened, other regions will be too light. Similarly, if the exposure time is lengthened to darken areas that are too light, the final printed image will include areas that are too dark.

An experienced photographer, however, may compensate by dodging. In this process, the print is made so that bright areas are printed properly. In areas which would otherwise be printed too dark, the exposure is limited by moving an opaque object such as a properly shaped card or other obstruction between the print paper and the exposing light. The movement of the opaque card blocking the exposure light reduces the total light, and therefore the exposure, in the darker areas of the image. Dodging may be thought of as an equivalent of subtracting a low-pass filtered version of the image from the dark regions. Detail is preserved and the intensity of the image area is kept within the range of the print paper. If the photographer is not careful and inadvertently interferes with exposure light applied to a light region around the dark region, a halo may be created around the dark region in the final print.

In a related photographic development technique known as masking, a positive transparency is made of a slightly blurred version of the image and inserted in the path of the exposure beam during development. The blurred positive forms a mask to diminish exposure of the print paper in dark regions. Subtraction of this mask, which is a scaled and low-pass filtered version of the image, reduces the range of the image to match that of the print paper. Masking also increases the incremental contrast in the final print because it is a form of high-pass filtering.

Unlike the dodging process, the mask which is subtracted does not have sharply defined borders between regions. Halos are therefore created by masking that are often objectionable near large changes in image brightness.

In the electronic image processing analog to masking, a blurred, scaled version of the image is subtracted from the original to scale the range of the final result to fit that of the display medium. The blurred, scaled version of the image may be obtained optically or electronically. Near sharp borders or sharp changes of intensity, this method produces halos that can be objectionable and may exceed the dynamic range of the presentation medium. To reduce the halo effect, the amount of the low-pass version that is subtracted varies adaptively with the magnitude of the spatial derivative of the image. That is, the degree of masking is adjusted in accordance with the magnitude of the difference between the sharp and blurred versions of the image. This technique of varying the degree of masking is called adaptive filtering herein.

In general, dodging has the advantage over adaptive filtering for image processing for presentation, because dodging compresses the range of the image to fit that of the presentation medium and preserves the original detail contrast uniformly within regions. Adaptive filtering does not preserve the original detail as well as dodging. In regions of high contrast texture, for example, adaptive filtering changes the image very little. Also, the techniques used for overshoot correction in adaptive filtering do not enhance the detail near high contrast edges.

Techniques for adaptive filtering are well known, and are, described for example by William F. Schreiber in the article entitled "Image Processing for Quality Improvement", Proceedings of the IEEE, Vol. 66, pp. 1640-1651, 1974. In such techniques, low-pass filtered image gradients serve as an adaptive modifier of the low-pass filtered images before subtraction from the original image, in order to diminish the haloing that would otherwise result from the high-pass filtering step.

Conventional image processing techniques for color and brightness constancy, that is color and illumination intensity corrections, such as dodging and adaptive filtering may not be suitable for real-time video image processing. Dodging is performed manually for photographic processing. Adaptive and high pass filtering have been implemented with digital signal processors but have been limited in size of the image area that can be processed with convenient amounts of computing power and memory storage.

A substantial improvement in image processing, beyond that available with conventional digital techniques, which is suitable for real time video image processing is shown in U.S. Pat. 4,786,818, Mead et. al. which discloses an integrated image processor, known as a spatially-weighted analog or resistive grid, for processing black and white electronic images. The Mead resistive grid is a low-power analog chip that includes image sensors and processors on the same chip and does not require substantial storage memory. The grid performs high-pass filtering of the image and so suffers from haloing effects.

What is needed therefore is a brightness and color constancy correction technique which permits images to be recorded and/or displayed in a manner similar to that as perceived by the human viewer at the time of image capture which can conveniently be accomplished in real or near real time without haloing or other substantial distracting distortions.

SUMMARY OF THE INVENTION

The preceding and other shortcomings of the prior art are addressed and overcome by the present invention that provides a method of image processing by applying points of a spectral component of an image to spatially related points in an analog smoothing grid, spatially weighting the spatially related points to form a corresponding spectral component mask, the spatial weighting being linear for differences in image intensity between neighboring points in the spectral component below a predetermined level related to the image intensities in the component and non-linear for differences in image intensity between neighboring points in the spectral components above the predetermined level, forming a second, differentially scaled, spectral component mask and subtracting the differentially scaled spectral component masks from the image to form a composite image.

In another aspect the present invention provides a method of image processing by applying image intensities to an analog smoothing grid to form a spatially weighted mask, selecting a predetermined level of intensity difference related to the intensities above which the spatial weighting is non-linear and below which the spatial weighting is linear and subtracting the mask from the image to form a composite image whereby adverse effects of variations in the intensities in the image are reduced in the composite image.

In a further aspect the present invention provides a method of applying range compression to an image by applying an image to an analog resistive grid to generate a spatially weighted image mask therefrom, adjusting the resistive grid to cause image segmentation in response to differences in image intensities, such differences being in a range to be compressed, and subtracting the image mask from the image to produce a range compressed composite image.

In a further aspect, the present invention provides an image processing system including an analog smoothing grid, means for applying points of a spectral component of an image to spatially related points in the analog smoothing grid to form a spectral component mask, means for selecting a predetermined level of image intensity difference below which the spatially related points are linearly weighted and above which the spatially related points are non-linearly weighted in the spectral component mask, means for forming a differentially scaled spectral component mask corresponding to a different spectral component of the image, and means for subtracting the spectral component masks from the image to form a composite image.

In a still further aspect, the present invention provides an image processing system an analog smoothing grid, means for applying image intensities to the analog smoothing grid to form a spatially weighted mask, means for controlling a saturation level related to the intensities between points in the analog smoothing grid above which the spatial weighting is non-linear and below which the spatial weighting is linear, and means for subtracting the mask from the image to form a composite image in which adverse effects of variations in the intensities in the image have been reduced.

In a still further aspect, the present invention provides apparatus for applying range compression to an image including means for applying an image to an analog grid to generate a spatially weighted image mask therefrom, means for adjusting the grid to cause image segmentation in response to differences in image intensities, the differences being in a range to be compressed, and means for subtracting the image mask from the image to produce a range compressed composite image.

These and other features and advantages of this invention will become further apparent from the detailed description that follows which is accompanied by one or more drawing figures. In the figures and description, numerals indicate the various features of the invention, like numerals referring to like features throughout both the drawing figures and the description.

BRIEF DESCRIPTION OF THE DRAWINGS

FIG. 3 is an illustration of the segment of resistive grid 10 depicted in FIG. 1 in which the amplitudes of signals applied to grid nodes are displayed along the Vertical or "Z" axis.

DETAILED DESCRIPTION OF THE PREFERRED EMBODIMENTS

In the following detailed description of the preferred embodiments of the present invention, the use of modified resistive grids for color constancy corrections will be described with regard primarily to FIGS. 1 through 10, followed by the description with regard primarily to FIGS. 11 through 14 of the use of a modified resistive grid including saturable elements for brightness and color constancy correction.

Figure 1:
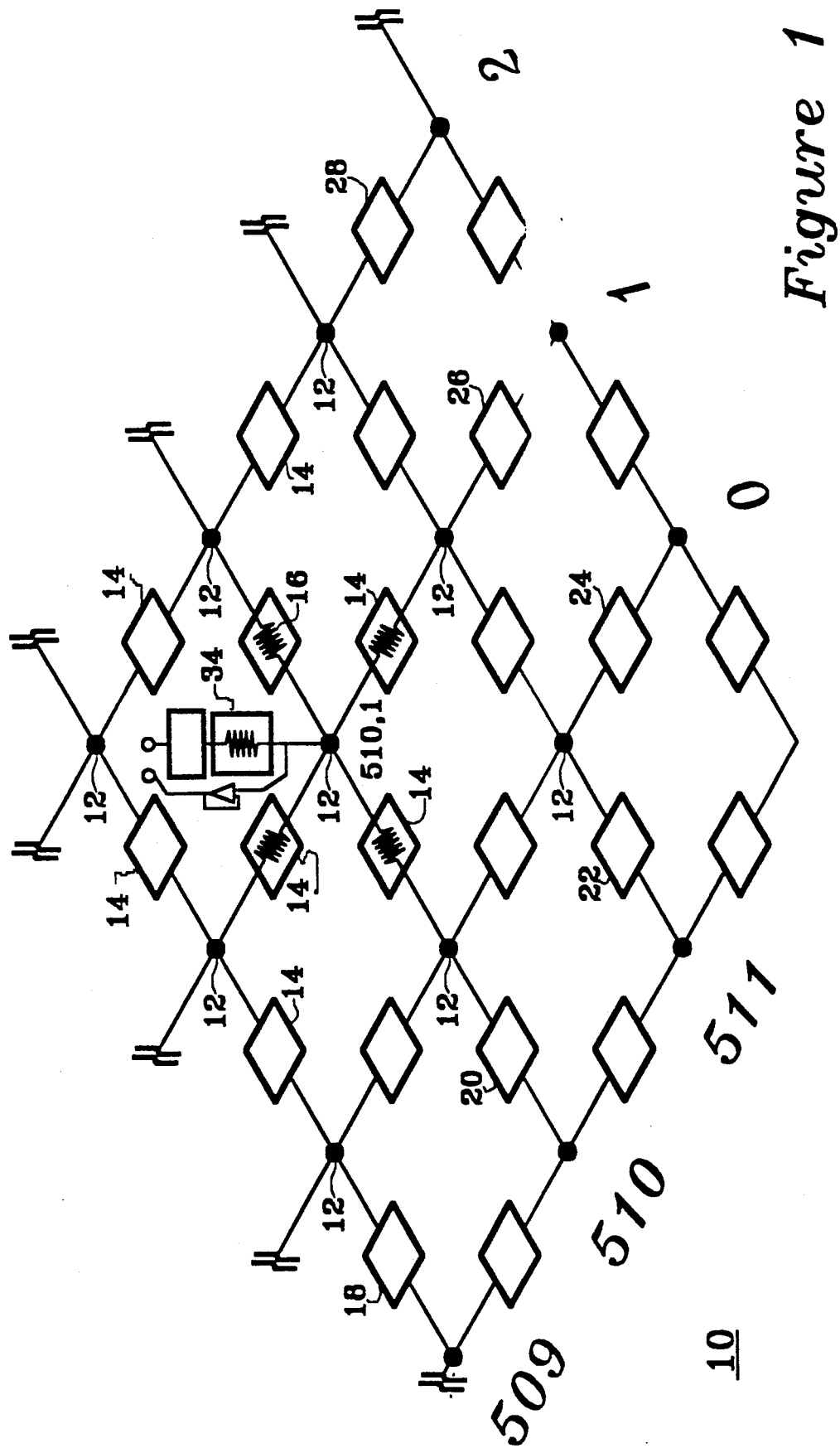
FIG. 1 is a schematic illustration of a segment of resistive grid 10 according to the present invention.

FIG. 1 is a schematic illustration of a segment of resistive grid 10 constructed in accordance with the present invention. The use and operation of resistive grid for color constancy correction will be described below, after a detailed description of its configuration.

As shown in FIG. 1, each grid node 12 represents a point in one color channel of a color image to be corrected for color constancy. In a video imaging system, each grid node 12 might represent a particular pixel in the image, each pixel being shown in its proper relationship to surrounding pixels.

In a typical video image, for example, a 512 row by 512 column matrix array of pixels might be used to represent an image frame in each color channel of a particular image. The segment of resistive grid 10 shown in FIG. 1 would then represent a portion of the lower left hand corner of that image, including pixels in columns 0 through 2 of rows 509 through 511. Each pixel or grid node 12 could then be identified or addressed by its row and column number, such as grid node 510,1 shown in FIG. 1

Each grid node 12 is interconnected to its neighboring grid nodes by grid element 14 which may be a resistor, capacitor, inductor or other serial element. In a practical embodiment of a resistive grid, the physical elements interconnecting each node may conveniently be controllable elements, such as MOSFET transistors, controlled to provide the appropriate resistance value.

By way of illustration, grid node 510,1 is connected to grid node 510,2 via grid element 14, such as resistor 16. For the purposes of this description, all grid nodes 12 are assumed to represent points in the color image to be corrected and all grid elements 14 are assumed to be resistors 16 of equal value.

Each grid node 12 is connected to an input information channel by grid node I/O circuitry 34, a representative example of which is shown connected to grid node 510,1 and is described in more detail with reference to FIG. 2 below.

Figure 2:
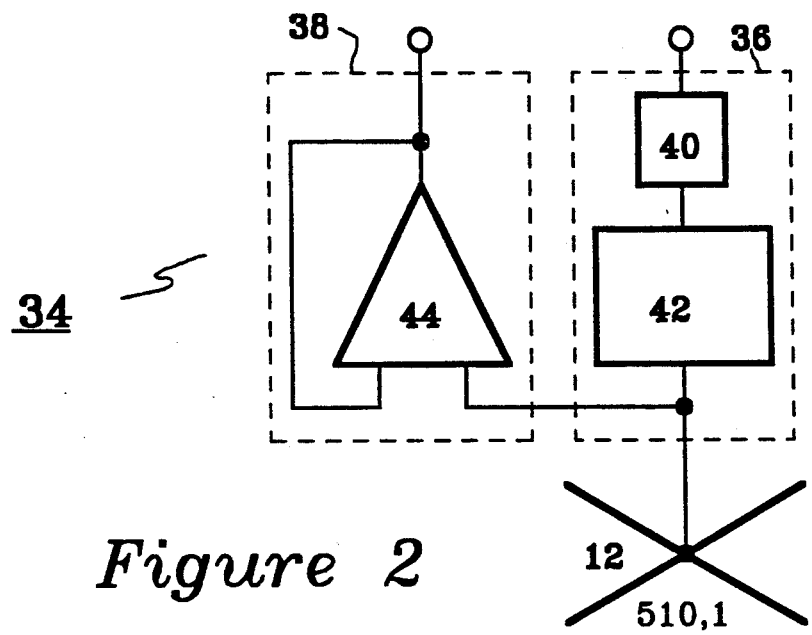
FIG. 2 is an enlarged schematic illustration of grid node I/O circuitry 34, depicted in FIG. 1.

FIG. 2 is an enlarged schematic illustration of representative grid node I/O circuitry 34, depicted in FIG. 1. Grid node I/O circuitry 34 includes node input channel 36 through which a signal representing a color value of a pixel in an image to be corrected is applied to grid node 12. Grid node I/O circuitry 34 also includes node output channel 38 through which a signal representing a color value of a pixel in a smoothed image is applied from grid node 12 to other circuitry as described below, for example, with regard to FIG. 4.

Grid element 42 may be the same as grid element 14, such as resistor 16, and have the same value as all other grid elements or a different value depending upon the application.

Node output channel 38 provides a high impedance output connection for determining the corrected color value on grid node 12 without changing its value such as amplifier 44.

The operation of resistive grid 10 will now be described with regard to the following example in which the overabundance of red light, if any, is to be determined using a common color constancy algorithm. This algorithm is similar to the process proposed by Dr. Edwin H. Land and John J. McCann, described in the article entitled "Lightness and Retinex Theory", Journal of the Optical Society of America, Vol. 61, January 1971.

In accordance with the invention, a composite of spatially extended estimates of the average value of the spectral content of each point in the image is formed in accordance with a weighted spatial average. That is, in this example, the intensity of red at each grid node 12 will be estimated from the average of the intensity of red at that grid node plus a spatially weighted average of the intensity of red at all other grid nodes 12. The weighting used is a function of distance, that is, the further from the node of interest, the lower Weight given to the red intensity of another node.

In particular, the intensity of red light of each pixel in the image to be corrected is applied to node input channel 36 of grid node I/O circuitry 34 associated with the grid node 12 which represents that pixel. A signal representing the intensity of red light for each pixel is therefore held in the appropriate sample and hold circuitry 40 associated with the corresponding grid node 12.

FIG. 3 is an illustration of the segment of resistive grid 10 depicted in FIG. 1 in which the amplitudes of signals applied to grid nodes along row 510 and along column 1 as a result of the color value signal applied to grid node I/O circuitry 34 associated with grid node 510,1 are displayed along the vertical or "Z" axis.

The amplitude of the signal at grid node 510,1 resulting from the color value signal applied to grid node I/O circuitry 34 is a function of the relationship between grid element 42, shown in FIG. 2 and all other grid elements 14 along row 510 and column 1. The amplitude at grid node 510,1 is a maximum, while the amplitudes at other grid nodes decrease monotonically with distance from the maximum. The shape of the decreasing amplitude pattern or profile or transfer function may be changed by altering grid node interconnections. In the example shown in FIG. 3, the amplitudes of the voltages at the grid nodes along row 510 are depicted by dotted curve 46 while the amplitudes of the voltages at the grid nodes along column 1 are depicted by curve 48. Curves 46 and 48 therefore represent spatially extended estimates of spectral content for the image point represented by grid node 510,1.

The discussion above was related to the amplitudes of signals along the row and column associated with a single grid node to which a color value signal was applied. In the actual operation of resistive grid 10, color value signals would be applied to all grid nodes substantially simultaneously, in real or near real time. That is, in video imaging as an example, in the course of a raster scan of one frame, color value signals would be applied in turn to all sample and hold circuits 40, but each grid element 42 would apply the color value signal held in the corresponding sample and hold circuitry 40 throughout the raster scan. In other color imaging systems, the color value signals may be applied simultaneously to all grid nodes. The signal amplitudes detected by node output channel 38, shown in FIG. 2, for each grid node is a composite of the spatially extended estimates of the spectral content at all grid nodes formed by summing of the signals at each grid node resulting from the signals applied to all grid nodes. In this manner, resistive grid 10 may be said to perform a low-pass filtering operation on the image.

The color value signal input into each node output channel 38 is a spatially weighted average of the color value signals applied to all nodes in resistive grid 10. It may be helpful to visualize the spreading effect of a color value signal applied at each grid node as a tent like outline, with the tent pole for that color value signal at that grid node. As noted above, the shape of the amplitude profile or transfer function, or spatially extended estimate of spectral content, may be different for different applications. A dome shaped or other monotonically decreasing amplitude profile, with a maximum at the grid node related to the spectral content or color value signal being smoothed, may be used. In any event, the compositing of the estimates occurs substantially simultaneously or in real time to provide a grid of spatially smoothed or averaged values of estimates of spectral content formed from the applied color value signals.

Figure 4:
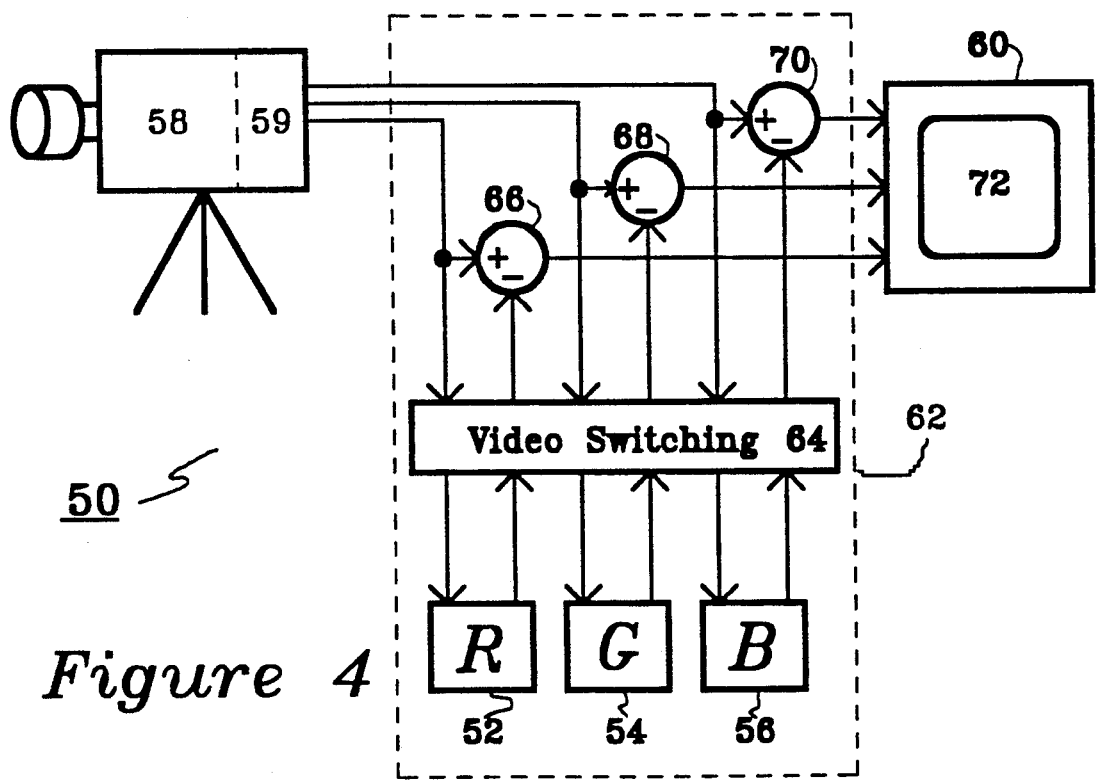
FIG. 4 is a schematic illustration of color constant video system 50 utilizing grids 52, 54 and 56, in accordance with the present invention.

FIG. 4 is a schematic illustration of a color constancy video system 50 utilizing grids 52, 54 and 56, each of which may be constructed in accordance with the description of resistive grid 10 shown in FIG. 1 above.

Color constant video system 50 includes a conventional video image capture system such as videocam 58 and a conventional video image display system such as color monitor 60. Color constant video system 50 uses three color channels, red, green and blue, to capture and reproduce a color image. Other color schemes could be used, with three or more channels, as long as the colors were selected so that a full color spectrum could be reproduced by combining the color channels.

In addition to conventional videocam 58 and color monitor 60, color constant video system 50 includes color correction subsystem 62. Videocam 58 is shown to include nonlinear scaling system 59 the operation of which will be described below in greater detail with respect to FIG. 12. The following description of the operation of color correction subsystem 62 is applicable to videocam 58 whether or not non-linear scaling system 59 is included and operable therein.

Color correction subsystem 62 operates in real time or near real time to improve color constancy by operating on the three color channels to reduce the effects of the color of the ambient lighting. In general, color constancy is achieved by determining a spatially extended and weighted averaged estimate of spectral content for each pixel in each of the three color channels and removing the resultant composite. In other words, differentially scaled spectral component masks are formed by application spectral component images to analog smoothing grids and combined with the image, by for example subtraction, to form a composite image.

Video switching network 64 receives the red, green and blue color channels from videocam 58 and applies them to red, green and blue grids 52, 54 and 56 respectively. Each pixel in each color channel of the color image from videocam 58 is applied to an appropriate node input channel 36 corresponding to the assigned grid node in the appropriate color correction grid. Each resistive grid forms an image of the spatially weighted average of the corresponding color signal which is provided by each node output channel 38 back to video switching network 64.

In each channel, the original image from videocam 58 is then modified in accordance with the composite of spatially extended estimates of spectral content, or spectral mask, by subtraction of the spatially weighted average image from video switching network 64 in red, green and blue image subtractors 66, 68 and 70. The resultant color constancy improved video image may then be displayed on monitor 60 as image 72.

Referring now again in detail to FIG. 4, the image is sent to grids 52, 54 and 56 for low-pass filtering so that upon subtraction of the grid outputs by way of subtractors 66, 68 and 70, the resultant high-pass filtered image has the proper balance of upward-going and downward-going overshoots. Conventional video sensors, such as videocam 58, often include non-linear scaling system 59 as shown in FIG. 4, so that an appropriate nonlinear scaling correction is applied before low pass filtering when color correction subsystem 62 is connected thereto.

Image 72 is color constancy corrected in that within each color area or segment, color from the ambient illumination on average has been removed. However, image 72 includes a substantial image degrading error, called haloing. In particular, at each major color change boundary, the color constancy correction is inaccurate, adding a halo of an inappropriate color on both sides of a sharp color transition.

Figure 5:
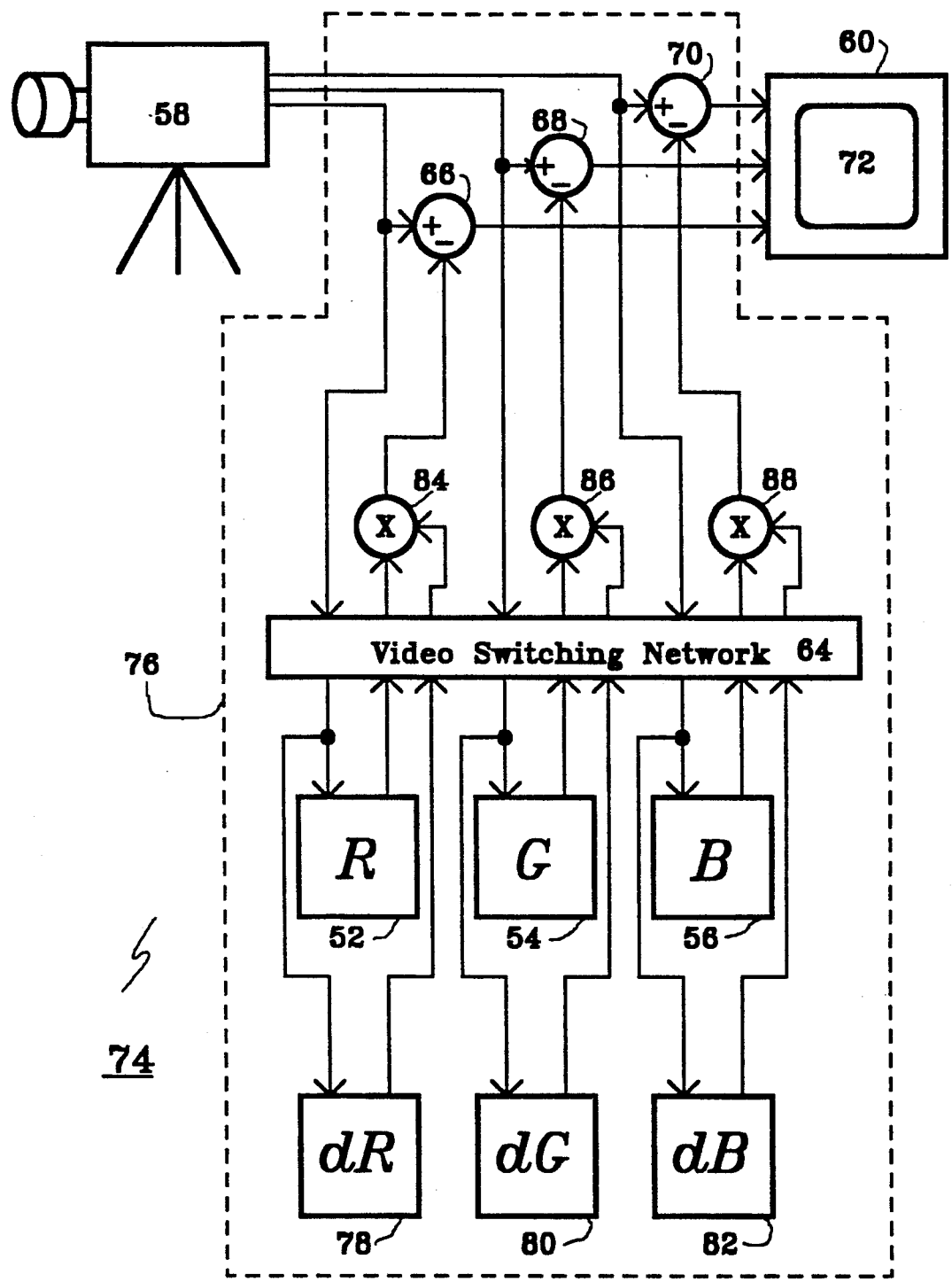
FIG. 5 is a schematic illustration of a halo corrected color constant video system 74 embodiment of color constant video system 50 shown in FIG. 2 above using a pair of resistive grids in each color channel.

FIG. 5 is a schematic illustration of a halo corrected color constant video system 74 utilizing grids 52, 54 and 56 as well as videocam 58 and color monitor 60 described above with respect to color constant video system 50 shown in FIG. 2. In place of color correction subsystem 62, however, halo corrected color constant video system 74 includes color correction subsystem 76. Color correction subsystem 76 processes red, green and blue color channels from videocam 58 through video switching network 64 to develop spatially weighted color surround images in grids 52, 54 and 56. The signals subtracted from the original three channels of color image by red, green and blue image subtractors 66, 68 and 70 are modified versions of the spatially weighted outputs from grids 52, 54 and 56. They are modified in accordance with image gradients. In particular, they are modified in accordance with the rate of change of illumination in the vicinity of each pixel.

The subtracted signals are the product of the outputs of grids 52, 54 and 56, and the outputs of color transition detection grids 78, 80 and 82, formed in multipliers 84, 86 and 88. Each color transition detection grid 78, 80 and 82 receives the same input from video switching network 64 applied to the corresponding grids 52, 54 and 56. The outputs of color transition detection grids 78, 80 and 82 however correspond to estimates of local image gradients, in particular, the degree of "edginess" or rate of change of color within each channel at each grid node.

Each pixel in each of these outputs represents the degree of color change within each channel in the immediate vicinity of the grid node related to that pixel. Color transition detection grids 78, 80 and 82 may therefore be considered to be low-pass filtering the derivatives of the images that are low-pass filtered by grids 52, 54 and 56.

Figure 6:
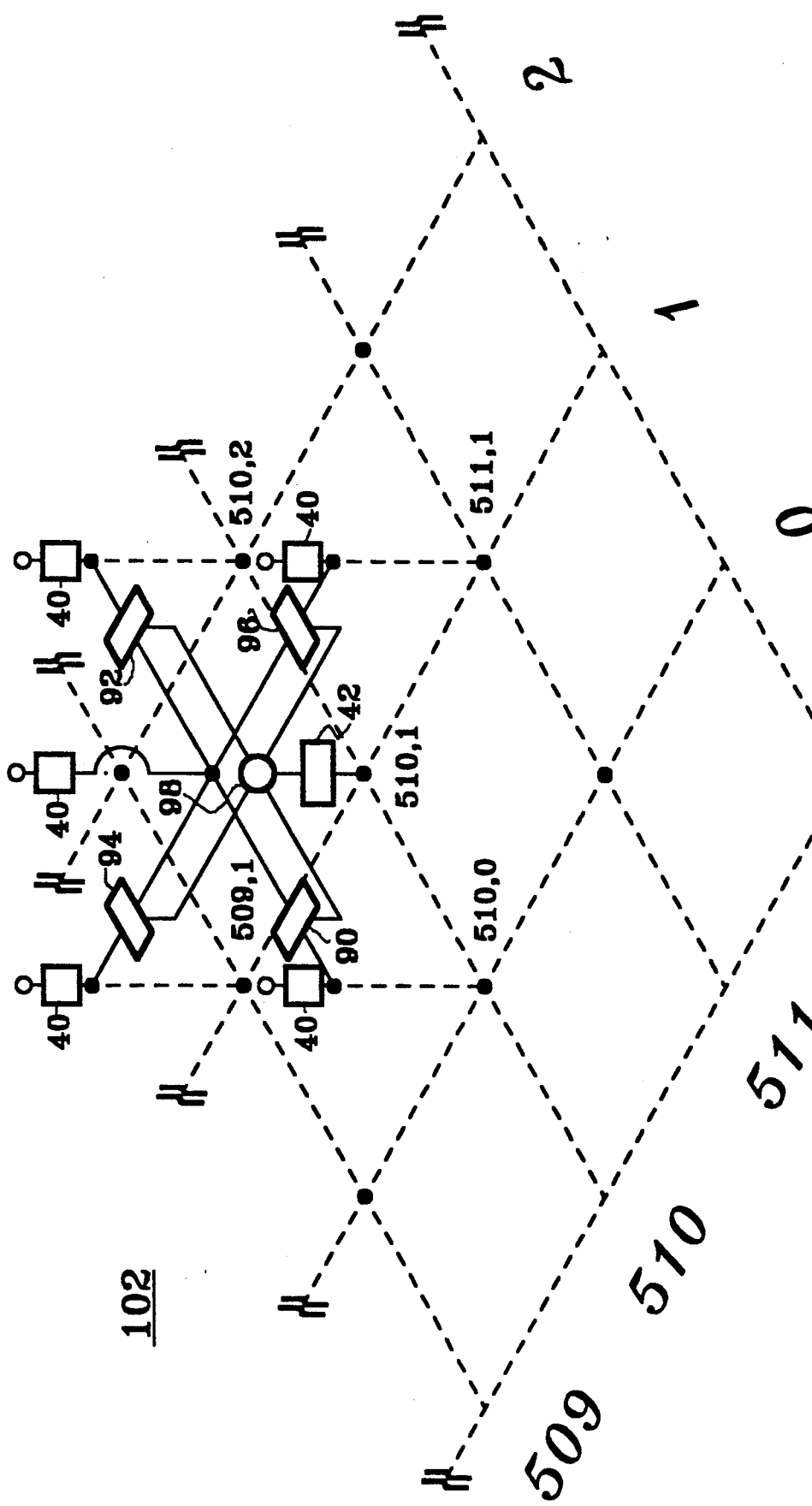
FIG. 6 is a schematic illustration of derivative node input channel 102 for one grid node of color transition detection grid 78 used in halo corrected color constant video system 74 as shown in FIG. 5.

The configuration of each color transition detection grid 78, 80 and 82 are substantially identical to each other and differ from grids 52, 54 and 56 only with regard to node input channel 36. FIG. 6 is a schematic illustration of derivative node input channel 102 for grid node 510,1 of color transition detection grid 78 used in halo corrected color constant video system 74 shown in FIG. 5.

The basic configuration of color transition detection grid 78 is the same as the configuration for resistive grid 10 shown in FIG. 1 except that the serial connection between sample and hold circuitry 40 and grid element 42 in each code input channel 36, as shown in FIG. 2, has been broken. The value held in sample and hold circuitry 40 associated with grid node 510,1 is compared with the color value signals held in the sample and hold circuitry 40 associated with each neighboring grid node.

In particular, as shown in FIG. 6, the color value in sample and hold circuitry 40 in image gradient or derivative node input channel 102 associated with grid node 510,1 is compared to the equivalent value in sample and hold circuitry 40 associated with grid nodes 510,0, 510,2, 509,1 and 511,1 in differential magnitude detectors 90, 92, 94 and 96, respectively. Each such differential magnitude detector operates to determine an image gradient at grid node 510,1, the relationship between color values at grid node 510,1 and its neighboring grid nodes by, for example, determining the absolute value of the average or maximum value of the difference between such values.

The outputs from differential magnitude detectors 90, 92, 94 and 96 are combined in average or maximum detector 98 to determine the gradient value to be applied to grid element 42 connected to grid node 510,1. Average or maximum detector 98 may be configured to average the input signals, select the largest value or perform any other convenient operation for determining a value related to the degree of color transition between the grid node of interest and its neighbors, that is, a local image gradient.

The resultant differential signals are smoothed and spatially averaged by the operation of the interconnected grid nodes in the same manner as described above with reference to resistive grid 10 shown in FIGS. 1 and 2 above. As discussed above with regard to the operation of halo corrected color constant video system 74 shown in FIG. 5, the smoothed, spatially averaged differential color value signals from each pixel in each channel are used to multiply the outputs of grids 52, 54 and 56 before those spectral mask signals are subtracted from the original color image in each color channel.

The result is that in halo corrected color constant video system 74, the color constancy corrections are applied in each channel in a manner reflecting the image gradient, the degree of local edginess or color transition, as well as the spatially weighted average illumination. In the particular example described in detail with reference to FIGS. 5 and 6, the color constancy corrections are weighted in favor of corrections determined near the color transition areas, but as a result of smoothing, the entire image in each channel is color constancy corrected for illumination color.

Figure 7:
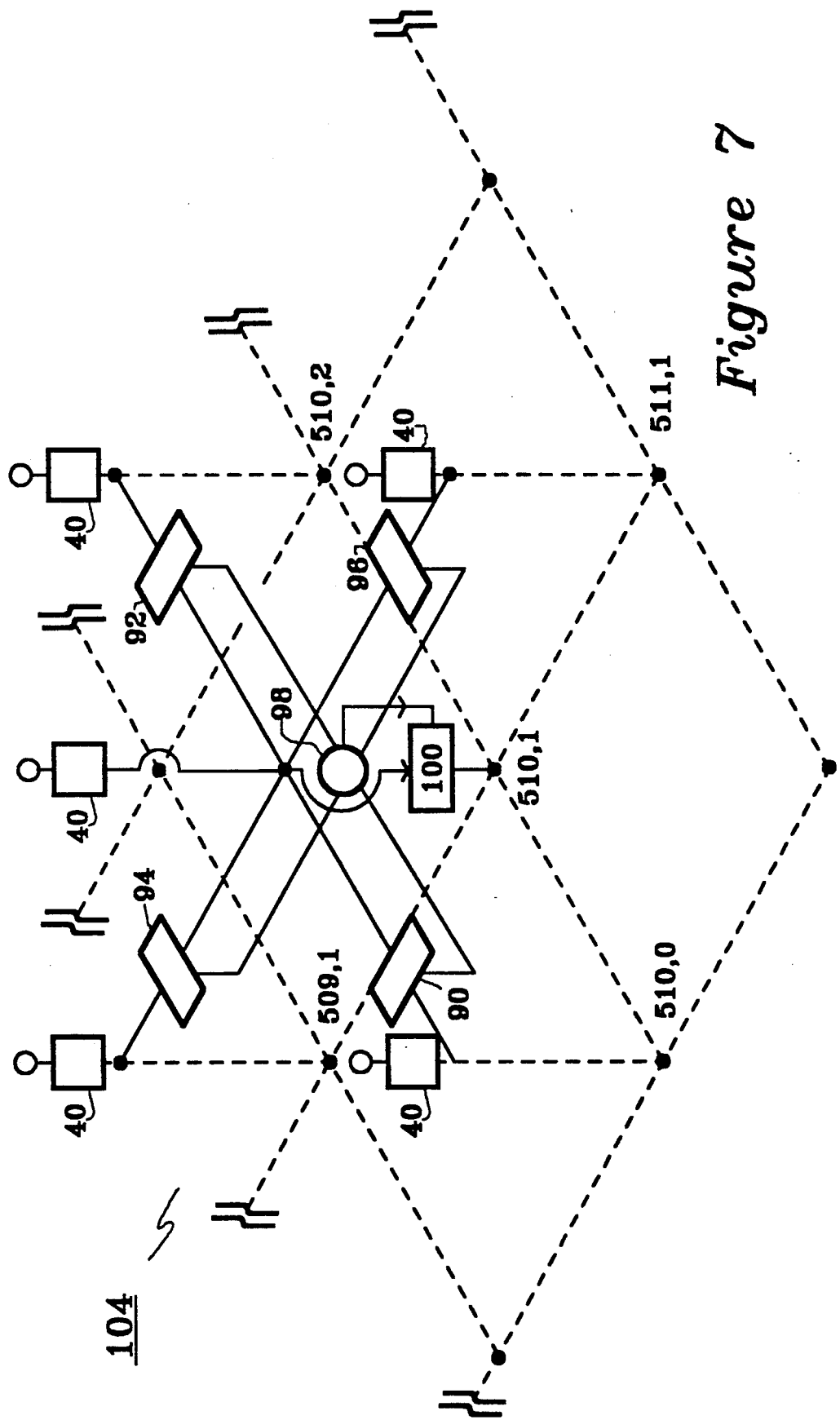
FIG. 7 is an illustration of derivative node input channel 104, an alternate embodiment of derivative node input channel 102, which can be used in color constant video system 50, shown in FIG. 2, to provide halo corrected color constancy using only one modified resistive grid per channel.

FIG. 7 shows derivative node input channel 104, an alternate embodiment of derivative node input channel 102 which can be used in place of node input channel 36 to modify grids 52, 54 and 56 in color constant video system 50, shown in FIG. 2, to provide halo corrected color constancy using only one such modified resistive grid per channel. In color constant video system 50 using such modified resistive grids, the color constancy corrections are determined primarily at color transition zones and then smoothed across the image in each color channel and applied to the entire image.

FIG. 7 is a schematic illustration of derivative node input channel 104 for grid node 510,1 of a modified color transition detection grid 52 used in color correction subsystem 62 to provide a halo corrected version of color constant video system 50 shown in FIG. 4.

The basic configuration of modified grid 52 is the same as the configuration for color transition detection grid 78 shown in FIGS. 5 and 6 except that the value held in sample and hold circuitry 40 associated with grid node 510,1 is applied to adjustable grid element 100 instead of grid element 42. The admittance of adjustable grid element 100 is controlled in accordance with a comparison of the color value signal applied to sample and hold circuitry 40 of grid node 510,1 with the color value signals held in the sample and hold circuitry 40 associated with each neighboring grid node.

In particular, as shown in FIG. 7, the color value in sample and hold circuitry 40 in derivative node input channel 104 associated with grid node 510,1 is applied to adjustable grid element 100. In addition, the same color signal is compared to the equivalent value in sample and hold circuitry 40 associated with grid nodes 510,0, 510,2, 509,1 and 511,1 in differential magnitude detectors 90, 92, 94 and 96, respectively. Each such differential magnitude detector operates to determine the relationship between color values at grid node 510,1 and its neighboring grid node by, for example, determining the absolute value of the difference between such values.

The outputs from differential magnitude detectors 90, 92, 94 and 96 are combined in average or maximum detector 98 to determine the admittance of adjustable grid element 100 connected to grid node 510,1. Average or maximum detector 98 may be configured to average the input signals, select the largest value or perform any other convenient operation for determining a value related to the degree of color transition between the grid node of interest and its neighbors such as a value proportional to the degree of color transition between the neighboring nodes of the grid node of interest.

The resultant differential signals are smoothed and spatially averaged by the operation of the interconnected grid nodes in the same manner as described above with reference to resistive grid 10 shown in FIGS. 1 and 2 above.

The result is that in halo corrected version of color constant video system 50 using derivative node input channel 104, the color constancy corrections are applied in each channel in a manner reflecting the degree of local "edginess" or color transition, as well as the spatially weighted average illumination. In the particular example described in detail with reference to FIGS. 2 and 7, the color constancy corrections are determined primarily at color transition zones and then smoothed across the image in each color channel and applied to the entire image.

The color constancy correction systems described in FIGS. 1 through 7 have utilized One or more resistive grids 10 or the equivalent per color channel. An array of integrating or accumulating elements can be used in lieu of such grids to provide a more easily configured equivalent of these color constancy masks. Such an array is used to first sequentially form spatially extended estimates of spectral content at points in the image and then to accumulate the estimates to form the composite.

Figure 8:
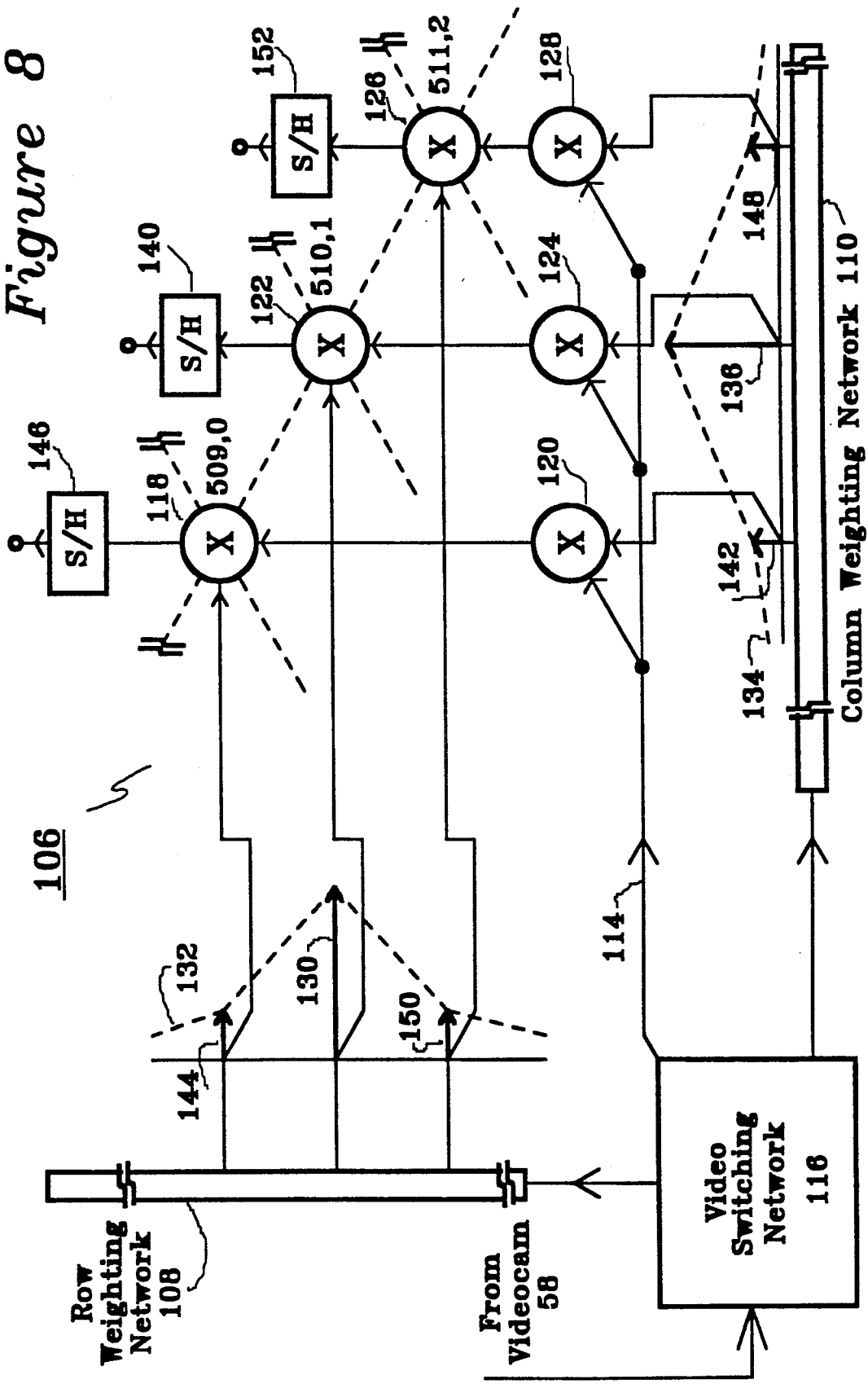
FIG. 8 is a schematic illustration of integrating or accumulating array 106 which can be used in lieu of the more complex resistive grid 10 shown in the previous figures.

FIG. 8 shows a segment of integrating array 106 including grid nodes 509,0, 510,1 and 511,2, video switching network 116 and row and Column weighting subsystems 108 and 110 which are used in place of the array of grid elements. Integrating array 106 reduces the complexity involved in color constancy correction grid 10 which requires a grid element 14 between each grid node by exploiting the commonalities of the weighting of the color value signals applied to each grid node.

The tent like profile or transfer function of the spatially extended and weighted estimate of spectral content is the same for each grid node in a column or row. In a linear grid representation of the image, the profiles in columns and rows would be equal to each other. Rather than create these profiles independently for each node in the grid, they may be stored in two dimensional row and column weighting subsystems 108 and 110 and applied to the color value signals as needed.

Each grid node only requires three values at one time; the color value signal, and the row and column spatial weighting values. Row and column weighting subsystems 108 and 110 store the profile so that each element of the array weights the input as a monotonically decreasing function of distance between the point in space represented by the element and the point in space represented by the color value signal. Once the entire image has been integrated with simultaneous weighting in this manner, the image color may be normalized by subtracting the spatial average from the input signal in each channel. That is, after integration, integrating array 106 may be substituted for resistive grid 10 to form a color constancy system. In particular, integrating array 106 may be substituted for each of the grids 52, 54 and 56 as shown in FIG. 4 to form color constant video system 50.

During operation of integrating array 106 as shown in FIG. 8, the color value signal related to each grid node is applied, one at a time during a point by point scan such as a raster scan, from videocam 58 to common input bus 114 by video switching network 116. Common input bus 114 is connected to row and column multipliers associated with each grid node. In particular, row and column multipliers 118 and 120, respectively, are associated with grid node 509,0 while row and column multipliers 122 and 124 and row and column multipliers 126 and 128 are associated with grid nodes 510,1 and 511,2, respectively.

The multiplications relating to each grid node may be performed in any order, or simultaneously, but are shown in the indicated order for convenience of discussion.

When, for example, the color value signal related to grid node 510,1 is applied to common input bus 114, column spatial weighting profile or transfer function 132 stored in row weighting subsystem 108 is indexed so that maximum value 130, representing the tent pole in the earlier analogy, is applied to row multiplier 122. At the same time, row spatial weighting profile or transfer function 134 stored in column weighting subsystem 110 is indexed so that maximum value 136 is applied to column multiplier 124. Maximum values 130 and 136 may be any value, typically unity.

During the raster scan, at the instant of time related to grid node 510,1 the color value signal on common input bus 114 multiplied twice by the maximum profile value, such as unity, is stored in integrating sample and hold 140. At that same instant of time, the same color value on common input bus 114 is multiplied by next adjacent profile weight 142 in column multiplier 120 and then by next adjacent profile weight 144 in row multiplier 118. The result is stored in integrating sample and hold 146 associated With grid node 509,0. Similarly, at that same instant of time, the color value on common input bus 114 is also multiplied by next adjacent profile weight 148 in column multiplier 128 and then by next adjacent profile weight 150 in row multiplier 126. The result is stored in integrating sample and hold 152 associated with grid node 511,2.

Therefore, at the instant of time during the raster scan associated with each grid node, the color value for that grid node may be added to the accumulators, such as integrating sample and hold 140 associated with each grid node, properly weighted by the weighting profiles stored in row and column weighting subsystems 108 and 110. The accumulation of simultaneously spatially weighted color values at each grid node occurs at video rates so that the values in the accumulators may be subtracted from the original color value in each color channel in real time. In particular, color constant video system 50 shown in FIG. 4 may be implemented with grids 52, 54 and 56 configured in accordance with integrating array 106 rather than resistive grid 10.

In the same general manner, one or more of constancy correction grids 52, 54, and 56 and/or color transition detection grids 78, 80, and 82, as shown in FIG. 5 and/or as modified in accordance with FIG. 7, may be configured from one or more integrating arrays 106.

Figure 9:
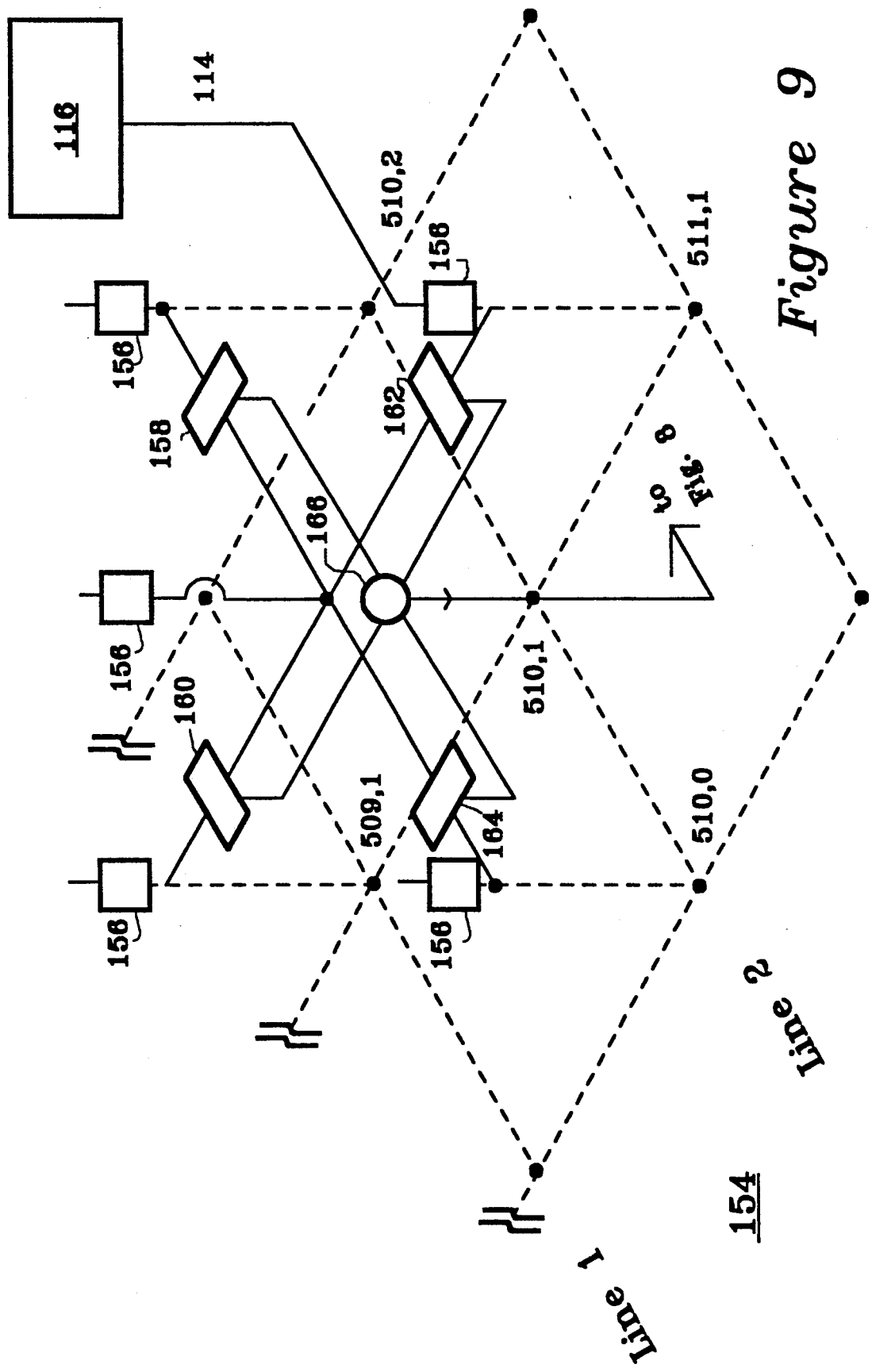
FIG. 9 is an illustration of a single grid node element within three line sample and hold 154 which may be added to integrating array 106 for use as a substitute for color transition detection grids 78, 80 and/or 82 as shown in FIG. 5.

Grids 52, 54 and 56 may each be implemented directly from a properly configured integrating array 106 as shown in FIG. 8. Substitution of integrating array 106 for color transition detection grids 78, 80 and/or 82 requires the addition of three line sample and hold 154, as shown in FIG. 9, between common input bus 114 and the column multipliers associated with column weighting subsystem 110. Substitution of integrating array 106 for constancy correction grids 52, 54 and/or 56 as shown in FIG. 4 when modified in accordance with derivative node input channel 104 as shown in FIG. 7 requires the substitution of three line sample and hold 155 shown in FIG. 10 for three line sample and hold 154.

Referring to FIG. 9, three line sample and hold 154 is configured as a three row segment of derivative node input channel 102 shown in FIG. 6. Video switching network 116 applies color value signals to each grid node in three line sample and hold 154. After all grid nodes in all three lines have received color value signals, the values stored in lines 2 and 3 are shifted up to lines 1 and 2, respectively, and the next row of color value signals are applied to line 3. The remainder of integrating array 106 operates one raster scan row behind the raster scanning of video switching network 16. The output of integrating array 106 is, of course, in synch with the raster scan.

The portion of three line sample and hold 154 shown in FIG. 9 includes grid nodes at the intersections of columns 0, 1 and 2 with rows 509, 510 and 511. Color value signals from common input bus 114 are applied to sample and hold circuitry 156 associated with each grid node. When a color value signal has been applied to a particular grid node on line 3 of three line sample and hold 154, the grid node associated with the same row in line 2 of three line sample and hold 154 may be processed and applied to the corresponding column multiplier. The following example of the operation of three line sample and hold 154 is based on processing of grid node 510,1 into integrating sample and hold 140, as shown in FIG. 8

Referring again to FIG. 9, after the color value for grid node 511,1 has been applied from common input bus 114 to the appropriate grid node in line 3 of three line sample and hold 154, the spatial derivative of the color value related to grid node 510,1 is determined. In particular, the color value signals associated with grid node 509,1 in line 1, grid nodes 510,0 and 510,2 in line 2 and grid node 511,1 in line 3 are compared with the color value signal associated with grid node 510,1 in line 2 by differential magnitude detectors 158, 160, 162 and 164 and combined in average or maximum detector 166.

The output of average or maximum detector 166 is a measure of the image gradient, the degree of edginess or color transition, at the pixel represented by grid node 510,1. The output of average or maximum detector 166 is applied to the column multipliers shown in FIG. 8. At the same time, column weighting subsystem 10 and row weighting subsystem 108 are indexed so that maximum value 136 and maximum value 130 are applied to column multiplier 124 and row multiplier 122, respectively. The results of these multiplications are stored and accumulated in integrating sample and hold 140.

After a complete frame has been processed for storage in integrating array 106 one row late in accordance with the above description of three line sample and hold 154, integrating array 106 provides the spatially weighted color value derivative information necessary for replacement of color transition detection grids 78, 80 and/or 82, shown in FIG. 5.

FIG. 1 is an illustration of three line sample and hold 155, a modified version of three line sample and hold 154 shown in FIG. 9, which may be added to integrating array 106 for use as a substitute for grids 52, 54 and/or 56 as shown in FIG. 4 when modified in accordance with derivative node input channel 104 as shown in FIG. 7. In this manner, a complete color constancy correction system including halo correcting derivative grids may be configured from a single integrating array 106 per color channel.

Figure 10:
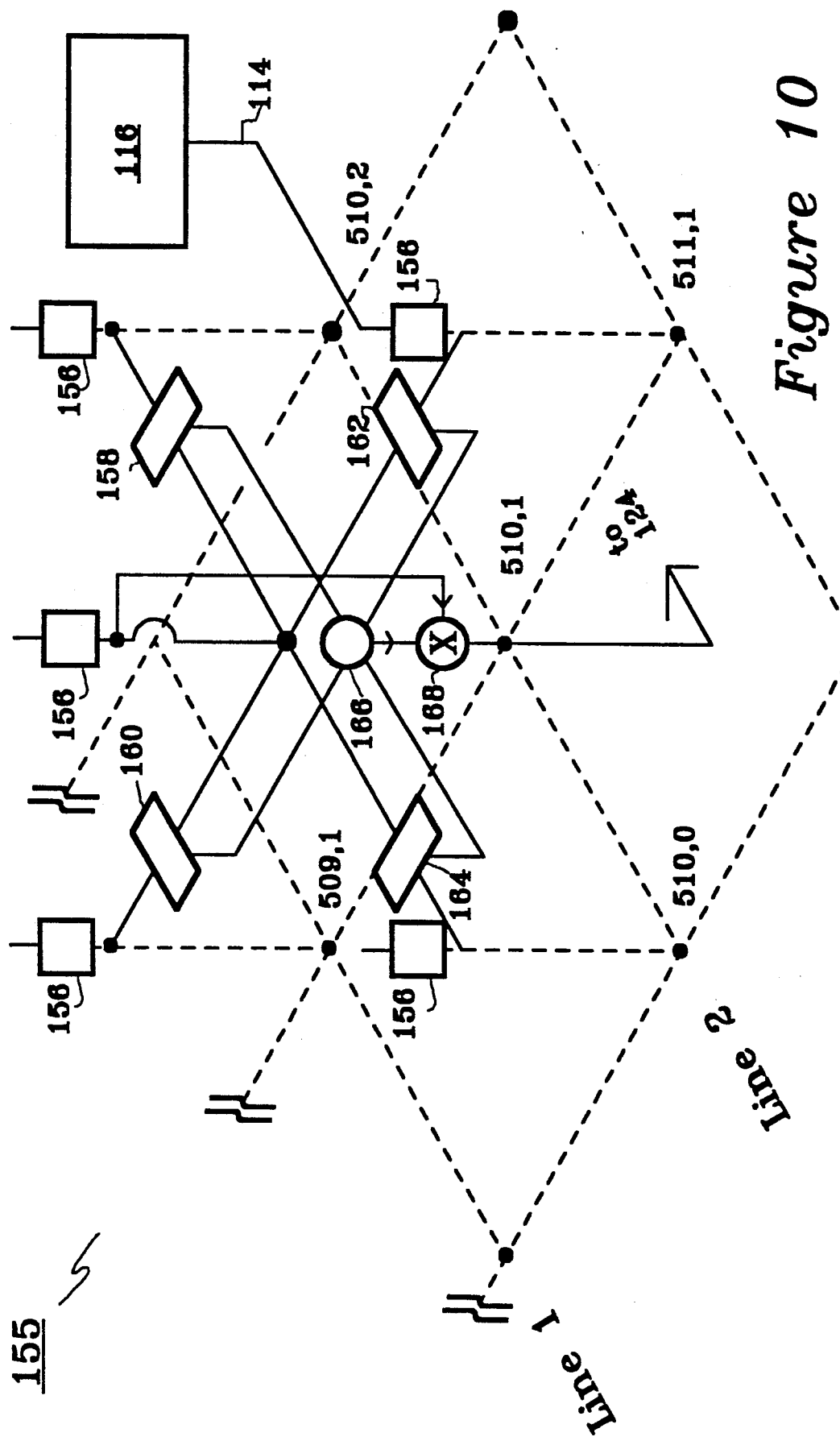
FIG. 10 is an illustration of three line sample and hold 155, a modified version of three line sample and hold shown in FIG. 9, which may be added to integrating array 106 for use as a substitute for grids 52, 54 and/or 56 as shown in FIG. 4 when modified in accordance with derivative node input channel 104 as shown in FIG. 7.

The portion of three line sample and hold 155 shown in FIG. 10 also includes grid nodes at the intersections of columns 0, 1 and 2 with rows 509, 510 and 511. Three line sample and hold 155 operates in the same manner as three line sample and hold 154 except that the output of average or maximum detector 166 is not applied directly to column multiplier 124 as shown in FIG. 8.

An integrating array 106 when modified with the addition of three line sample and hold 154 determines the spatially smoothed derivative of the color value signal. As shown in color correction subsystem 76 in FIG. 5, this spatially smoothed derivative image, similar to the outputs of color transition detection grids 78, 80 and 82, may be multiplied by the spatially weighted grid image and then subtracted from the original color image to provide an illumination corrected image.

The complexity of the system may be further reduced by combining the spatially weighted average and derivatives in the same grid as described with regard to derivative node input channel 104 in FIG. 7. The following description of the additional circuitry in three line sample and hold 155 permits the same reduction in complexity.

The output of detector 166 is a measure of image gradient at the pixel represented by grid node 510,1. The output of average or maximum detector 166 may be combined in grid node multiplier 168 with the original color value signal for the grid node being processed. The output of grid node multiplier 168 is then applied to the column multipliers shown in FIG. 8. The resultant output of integrating array 106 has therefore already been combined with the color value signal before spatial weighting. In this way, only one integrating array 106 is required per color channel to provide a spectral mask for color constancy correction without haloing.

The methods described above with regard to FIG. 1 through 10 for brightness and color constancy correction may all be considered to be forms of filtering. The resistive grid, and the integrating array, provide a convenient parallel processing, analog network for low-pass filtering an image.

Grids 52, 54, and 56 as shown in FIGS. 4 and 5, may be implemented as resistive grids as shown in FIG. 1 or as integrating arrays as shown in FIG. 8, to provide low-power, compact, video-rate filtering. To adaptively modulate the low-pass filtered image before subtraction, a low-pass filtered version of the image gradients may be obtained at video rates with the modified resistive grid shown in FIG. 6 or the integrating array as shown in FIG. 9. These modulating filters are represented as grids 78, 80, and 82 as shown in FIG. 5.

Alternatively, the low-pass filtering and gradient modulation may be implemented in a single, low-power, compact, device that operates at video rates by modifying the resistive grid as shown in FIG. 7 or the integrating array as shown in FIG. 10 to form filtering grids 52, 54, and 56.

As noted above, sensor signals from sensors such as videocam 58 shown in FIG. 4 have greater dynamic range than may be displayed on display media such as color monitor 60, requiring that the image as detected often be scaled down for the range of the display media. The techniques described above with regard to FIGS. 1 through 10 can be used to ameliorate the image degradation that results from such scaling.

Such scaling is necessary to insure that the sensor signal does not overload the display medium, but often resultants in the undesirable lowering of the incremental contrast of the image as displayed when compared to the original image. One technique for further reducing the image degradation resulting from such scaling is to preserve the high frequency information in the image by high pass filtering. High pass filtering of the image may be achieved by subtracting a low-pass filtered version of the image from the image before display.

This restores some of the incremental contrast that results from the sensor signal scaling. Simple high pass filtering, however, results in haloing at large steps in the image. As described below with regard now to FIGS. 11 through 14, high frequency information, which serves along with low frequency information to define the step, is preserved in the low pass filtered image to be subtracted during the high pass filtering process in order to reduce or eliminate the haloing problem in the resultant image as displayed.

Figure 11:
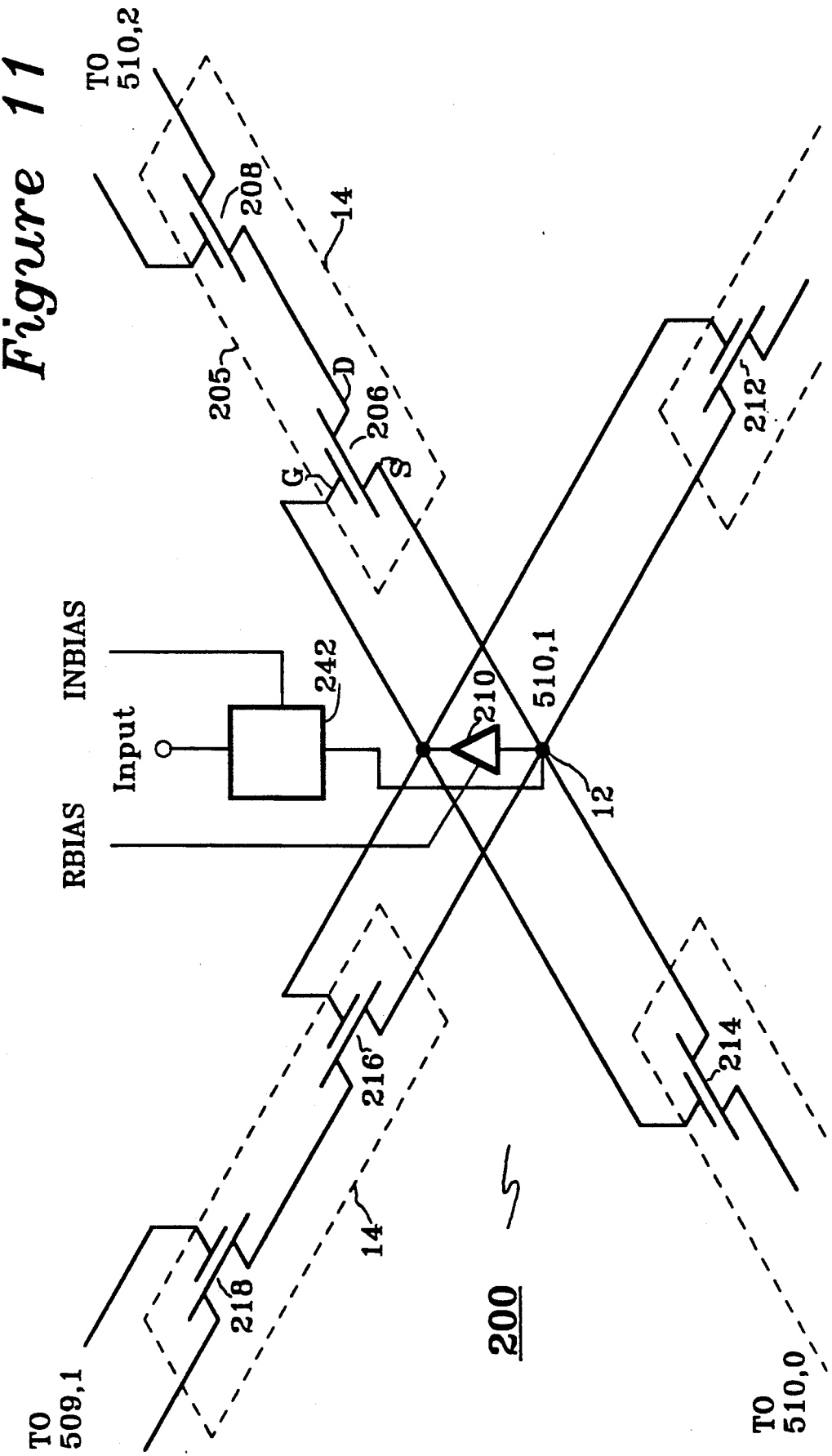
FIG. 11 is a schematic illustration of a single node of saturable resistive grid 200 illustrating lateral element FET pair 205, grid element 242 and bias circuit 210.

In order to preserve the high frequency image information in the low pass filtered version of the image, resistive grid 10 as shown FIG. 1 may be operated as shown in FIG. 11 to preserve high frequency information only at large steps in the image. This is accomplished by providing grid element 14 with a reduced linear range by controlling the bias thereof to control the saturation of grid element 14. The low pass filtered version of the image with high frequency image information is then preserved only at large step changes in the image intensity to provide a mask suitable for subtraction from the sensor signal to reduce the range of the sensor signal while maintaining or enhancing incremental contrast without causing haloing.

Referring now to FIG. 11, an enlarged portion of saturable resistive grid 200, similar to resistive grid 10 described above with regard to FIG. 1, is shown surrounding node 510,1. Resistive grid 10, as well as saturable resistive grid 200, may be implemented as described by Mead et al. in U.S. Pat. No. 4,786,818. In such an implementation, each grid element 14 is configured from a series connection of a pair of field effect transistors—or FETs—, shown in FIG. 11 as lateral element FET pair 205. Lateral element FET pair 205 between nodes 510,1 and 510,2 includes FET 206 associated with node 510,1 and FET 208 associated with node 510,2. The current flowing in series between nodes 510,1 and 510,2 flows through each FET of lateral element FET pair 205.

Figure 12:
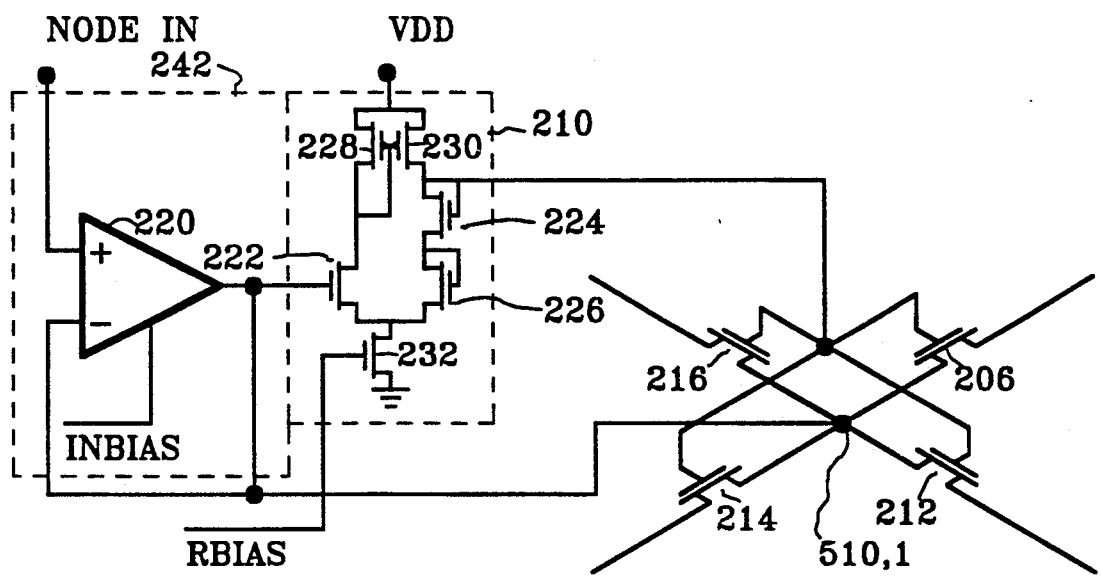
FIG. 12 is a schematic illustration of bias circuit 210 and grid element 242, together with the FETs surrounding the node, as shown in FIG. 11.

The source-to-gate voltage of FETs 206, 212, 214, and 216 surrounding node 510,1 is held constant by bias circuit 210, shown in greater detail in FIG. 12. In a similar manner, the source-to-gate voltage of FETs surrounding other nodes, such as FET 208 associated with node 510,2 and FET 218 associated with node 509,1, are controlled by bias circuits similar to bias circuit 210.

The input to all such bias circuits is controlled by the input signal RBIAS, which therefore controls the source-to-gate voltages of all lateral element FET pairs used to interconnect nodes in saturable resistive grid 200. A particular implementation of bias circuit 210 is shown in the implementation of grid element 242 shown in FIG. 12 and disclosed in greater detail in the Mead et al. patent referenced above, for example, in FIGS. 4a and 4c therein.

Referring now to FIG. 12, grid element 242 associated with node 510,1 is disclosed, together with FETs 206, 212, 214, and 216, as a preferred embodiment of grid element 42 of FIG. 2. The image intensity signal handled by sample and hold circuitry 40 for node 510,1 is applied to one input of operational amplifier—or op amp—220, the other input of which is connected to its output, FET 222 at the input of bias circuit 210, and grid node 12 at the common connection of the source terminals of FETs 206, 212, 214, and 216. The INBIAS bias signal is applied to op amp 220 to control the effective resistance of grid element 242 and therefore the current flowing through each lateral element FET pair 205 to adjacent nodes in order to cause smoothing.

In bias circuit 210, input FET 222 is one leg of a current divider including FETs 224 and 226 in the other leg. Power is applied to the current divider by FETs 228 and 230 and the current divider legs are connected to ground through FET 232 the gate input of which is controlled by RBIAS. In the linear mode of operation of saturable resistive grid 200, which is the same as the normal mode of operation of resistive grid 10, INBIAS and RBIAS are globally adjusted so that grid element 42 and grid element 14 operate in a linear manner.

Figure 13:
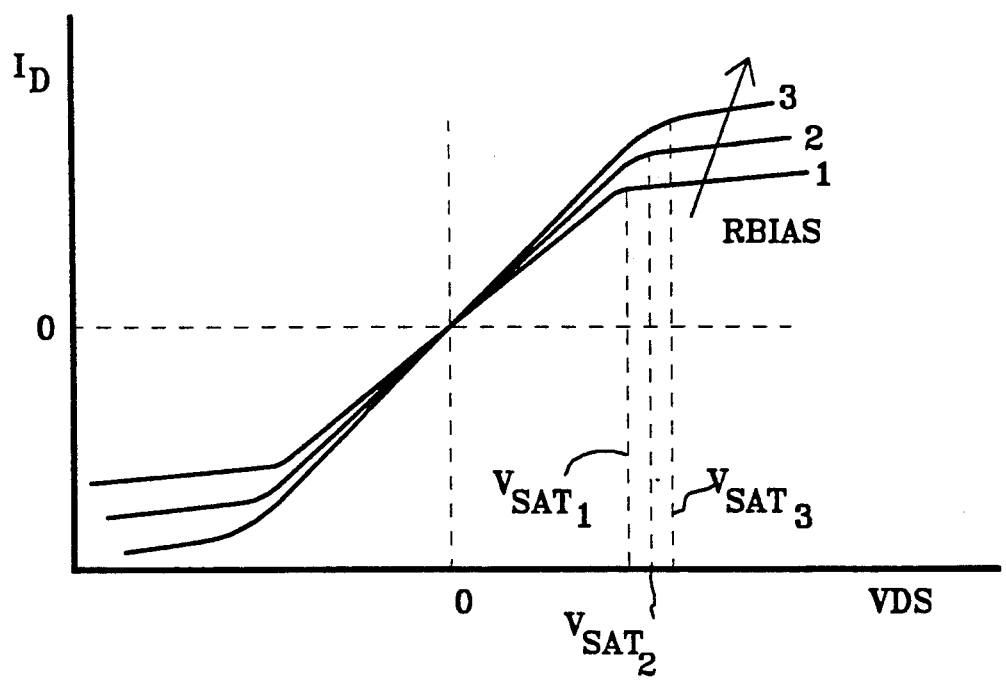
FIG. 13 is a graph illustrating $I_D$ as a function of $V_{DS}$ for various levels of RBIAS.

Referring now to FIG. 13, the drain current $I_D$ for each FET of lateral element FET pair 205 is shown as a function of the drain source voltage $V_{DS}$ there across for FET 26 for three different settings of RBIAS. The maximum $I_D$ is controlled by the source-to-gate voltage for each such FET and therefore by RBIAS. As RBIAS is increased, the maximum available current through each such FET is increased. For any particular setting of RBIAS, where $V_{DS}$ is below the saturation voltage,—or $V_{sat}$—of FET 206, a current is caused to flow through FET 206 that is linear with respect to the voltage applied. In this manner, each such lateral element FET pair 205 acts as a resistor because $V_{DS}$ is linearly related to $I_D$.

However, if $I_D$ exceeds $V_{sat}$, the FET saturates and ID reaches its maximum. Any further slight increase in current for $V_{DS}$ greater than $V_{sat}$, due for example to the channel length modulation of the FET known as the Early effect, is relatively minor compared to the incremental current increase for $V_{DS}$ below $V_{sat}$, and may be ignored for the purposes of the present description.

Grid element 14 may operate as both a linear element like a resistor for $V_{DS}$ below $V_{sat}$ and as a non-linear element as a current source for $V_{DS}$ greater than $V_{sat}$. Saturable resistive grid 200 therefore operates in different modes depending upon the relationship between the actual $V_{DS}$ and $V_{sat}$.

In normal or linear operation, saturable resistive grid 200 acts in the manner described above with regard to resistive grid 10 and smooths or low-pass filters an array of inputs applied to each node, such as node 510,1, by the spreading action of currents through each grid element 14 as long as $V_{DS}$ for each FET of lateral element FET pair 205 does not exceed $V_{sat}$. If, however, $V_{DS}$ exceeds $V_{sat}$, the operation of saturable resistive grid 200 becomes non-linear at least between the nodes interconnected by the lateral element FET pair 205 in which $V_{DS}$ has exceeded $V_{sat}$.

For example, if the difference between signal inputs applied to a pair of adjacent nodes, such as node 510,1 and node 510,2, is large enough so that $V_{DS}$ for FET 206 exceeds $V_{sat}$, saturable resistive grid 200 is operated in a non-linear manner in the book entitled "Analog VLSI and Neural Systems," Addison-Wesley, New York, 1989, pp. 122-123.

The relationship between $V_{DS}$ and $V_{sat}$ can be changed for any given value of $V_{DS}$ by simply adjusting $V_{sat}$. As is well known in the art, changing $V_{GS}$ changes $V_{sat}$. That is, as $V_{GS}$ is increased, the maximum current increases and therefore $V_{sat}$ is increased. In accordance with the present invention, the relationship between $V_{DS}$ and $V_{sat}$ is intentionally adjusted by for example adjusting RBIAS to change $V_{GS}$. Changing $V_{GS}$ changes $V_{sat}$ and causes saturable resistive grid 20 to go into saturation.

Figure 14:
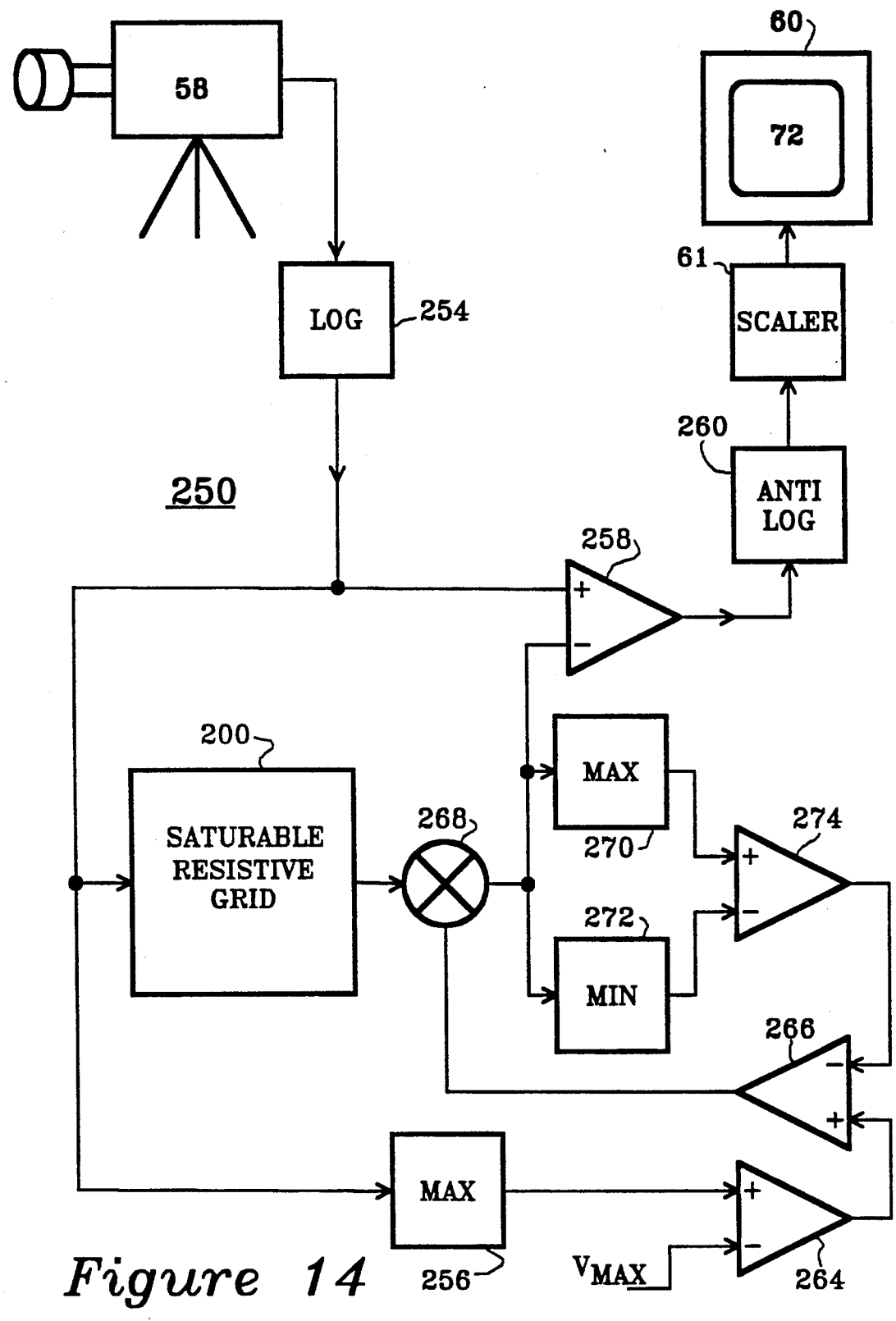
FIG. 14 is a block diagram illustration of constancy correction system 250.

For example, referring now to FIG. 14, a nominal setting of RBIAS results in a value of $V_{GS}$ that produces a saturation voltage of $V_{sat1}$. An increase in the value of RBIAS directly increases the value of $V_{GS}$ and results in a greater saturation voltage $V_{sat2}$, and a still greater value of RBIAS increases $V_{GS}$ still further and results in a still greater saturation voltage, $V_{sat3}$.

Saturable resistive grid 200 then operates in a non-linear manner when $V_{DS}$, half the voltage drop across lateral element FET pair 205 between any pair of nodes, exceeds a predetermined value.

That is, when there is a large step in image intensity between two image regions or segments, saturable resistive grid 200 is allowed to operate in a linear manner within each such image region to low-pass filter the image therein removing all high frequency components of the image in such regions. However, at the large step change in image intensity at the edges between such regions, saturable resistive grid 200 is caused to operate in a non-linear manner to preserve both the high and low frequency information in the filtered image at the edge between image regions.

When the image filtered in this way is subtracted from the original image, the range of the resulting signal is reduced as compared to the original signal without reducing incremental contrast, and therefore preserving detail, without introducing halo distortions at such region edges in which the large step change between regions causes non-linear operation of saturable resistive grid 200.

By controllably driving saturable resistive grid 200 into non-linear operation for step changes in intensity greater than a predetermined level between regions, sensor scaling may be accomplished without excessive loss of contrast and detail in individual regions and without causing haloing at the edges between regions. In this manner, a video image with both bright and dark regions or segments, such as might occur in a video image captured in a slightly darkened room including a bright sunlit image through a window, may be processed for improved display on a monitor having a dynamic range smaller than the range required to display both the darkened room and the bright window image. In particular, at the window sill in the image for example, there will be a large step change in image intensity at the edge between the bright window and the darkened sill.

Referring now for an illustrative example to the red channel of image processing provided in color constancy correction grid 52 shown in FIG. 4, the grid nodes 12 on opposite sides of the step change edge would have substantially different intensities of image signals applied thereto by the appropriate node input channel 36 as shown in FIGS. 2. If the magnitude of the step change exceeds the dynamic range of color monitor 60 used to display the image, the image may be scaled by operating color constancy correction grid 52 in the manner of saturable resistive grid 200 described above with regard to FIG. 11 so that lateral element FET pair 205 between the nodes surrounding the image intensity step reach saturation.

As noted above, saturable resistive grid 200 may be operated to selectably saturate for edges greater than a predetermined magnitude, that is, for $V_{DS}$ greater than a predetermined magnitude, by selectively adjusting RBIAS to selectively adjust $V_{sat}$. Therefore, when $V_{sat}$ for each FET in lateral element FET pair 205 is set lower than the $V_{DS}$ applied across by the step change edge of the image, segmentation occurs. By adjusting RBIAS to cause segmentation at such edges, color constancy correction grid 52 may be operated in a non-linear manner so that low pass filtering or smoothing occurs in the bright and dark regions separated by the window sill while retaining the high frequency or step change information related to the step change in intensity. When the resultant smoothed image or spectral mask is then subtracted in red image subtractor 66, image 72 may be displayed on color monitor 60 without haloing at the step change edge.

Since the reflectances of natural objects are known, as noted above, to vary in magnitude by no more than about a factor of twenty, steps in image intensity indicating changes of magnitude of intensity that are greater than about a factor of twenty are often due solely or in part to lighting effects such as shadows.

The Rule of Twenty is useful in determining how to adjust resistive grid 10 to operate in the manner of saturable resistive grid 200 to remove lighting effects when such a grid is used as correction grid 52 of color constant video system 5 as shown in FIG. 4. Grid element 42, such as the implementation shown as grid element 242 in FIG. 12, should be operated in a linear mode. This accomplished by choosing the setting for INBIAS so that op amp 220 operates in a linear region over the entire input signal range.

The sensor noise level, that is, the noise level of videocam 58, should then be determined. A noise level of about 20 millivolts is typical. Applying a factor of twenty to this noise level, in accordance with the Rule of Twenty referenced above, indicates that the maximum signal above noise that would be expected to result from changes in image intensity, would produce a maximum signal on the order of about 400 millivolts. Therefore, in accordance with this invention, for a sensor having an input noise level of about 20 millivolts, the magnitude or setting of RBIAS should be selected so that lateral element FET pair 205 saturates or operates in a non-linear region for image intensity step changes greater than about 400 millivolts.

It may be desirable to retain some information about lighting, for cosmetic or computational reasons, and so lateral element FET pair 205 may be biased for saturation at steps that are slightly greater than a factor of twenty. However, the point of saturation should not be set so high that the range of the output device, such as color monitor 60, is exceeded for a test image containing a large step change in image intensity.

In summary, saturable resistive grid 200 as shown in FIG. 11 smooths through small steps in image intensity but not through large steps in intensity, and the degree of smoothing or the transfer function is variable, being set by the ratio of the effective resistance of grid element 42 to the effective resistance of grid element 14 in its linear range of operation.

With regard therefore to FIG. 4, for regions or segments of the input image applied by videocam 58 image to color constancy correction grid 52 without large step changes in intensity, the grid may be operated in a linear region to provide low pass filtering of the image and therefore linear smoothing with a transfer function linear within the segment. The subtraction of the smoothed image in red image subtractor 66 will effect a high pass filtering of the image, so that incremental contrast is improved.

For adjacent regions separated by a step change in intensity beyond a predetermined level dictated by the Rule of Twenty or other level less than the dynamic range of the display device, the grid is operated in a non-linear manner at the edge of such regions. Since the range of the input image is reduced by subtraction of the non-linearly filtered image, saturable resistive grid 200 provides a mask which, when subtracted as a spectral mask for example in red image subtractor 66, achieves image contrast enhancement and range reduction simultaneously.

Therefore, with reference to a particular node of saturable resistive grid 200, the transfer function may be a linear tent—or dome-shaped profile as described above, or the transfer function referenced to that node may be spatially nonlinear, with smooth linear spatial weighting segments separated by a discontinuous contour along which the lateral elements of the grid are saturated, due to inputs in the segments on either side of the contour that result in values across the lateral elements that exceed the saturation level of the elements.

A resistive grid with nonlinear resistors such as saturable resistive grid 200 illustrated in FIG. 11 is a particular case of a general class of diffusive substrates capable of providing non-linear filtering. The disclosed device uses current diffusion for smoothing, with non-linear resistors to restrict flow, but charge flow, heat flow, and fluid flow are other examples of physical processes that could similarly be used to filter an image. Lateral elements could be used with such devices to restrict the flow of charge, heat, or fluid in order to carry out similar, non-linear filtering operations.

For example, if charge is stored at each node in an array in proportion to the intensity at the corresponding point in an image, a copy of the image is stored in the array. If each node is connected to its neighbors by switches, and the switches are opened briefly, the image is smoothed as charge spreads throughout the array. If the switches limit the amount of charge that may flow, then such switches serve the same purpose as the lateral element FET pair 205 shown in FIG. 11 and so the charge read out after such an operation could be used to form a mask for subtraction from the original image in accordance with the present invention.

Referring now to FIG. 14, constancy correction system 250 provides signal compression of the input image from videocam 58 with an automatic gain control—or AGC—technique to assure that the display range of monitor 60 is not exceeded. A typical display monitor such as a CRT has a maximum allowable signal value of about 0.9 Volts, after any non-linear scaling correction has been applied by, for example, non-linear scaling system 61. Although non-linear scaling system 59 is shown in FIG. 4 as included within videocam 58 to reflect the current practice in the design and manufacture of such cameras, in accordance with the present invention, it is preferable to provide such nonlinear scaling after the application of non-linear filtering with saturable resistive grid 200 as shown in FIG. 14.

In addition, it is well known that illumination interacts multiplicatively with reflectance. That is, in a logarithm of an image, the illumination and reflectance add. The illumination may then be subtracted directly, that is, a single value for RBIAS may be used to set $V_{sat}$ and therefore the intensity level at which segmentation is required to occur.

Subtraction of a logarithmically scaled, nonlinearly filtered image signal from the logarithmically scaled original image signal serves to provide an enhanced, dynamically scaled logarithmic image. The logarithmic scaling may then be removed and any other scaling, by for example non-linear scaling system 61 may then be applied.

If a logarithmic scaling is not used, or is used after a non-linear scaling has been applied, suitable scaling for $V_{sat}$ must be applied. That is, in a non-logarithmic processing system, the present invention benefits from adjusting the intensity level at which saturation, and therefore segmentation, occurs as a function of signal intensity in order to accurately maintain the relative contrast levels within each region.

Image enhancement system 250 shown in FIG. 4 is configured to provide a logarithmically scaled system. Only one channel of video information will be described with regard to constancy correction system 250 for convenience although multiple color channels will most likely be used to provide color video enhancement. In constancy correction system 250, videocam 58 provides the input video signal of the image, without if possible, any scaling such as by non-linear scaling system 59 shown in FIG. 4. The input video image is first applied to logarithmic scaler 254 the output of which is the logarithm of the input and is applied in parallel to saturable resistive grid 200, peak or maximum detector 256, and subtractor 258.

Subtractor 258 performs the same function as image subtractors 66, 68, and 70 perform for the each channel processed by video switching network 64 in FIG. 2. That is, subtractor 258 is used to subtract the smoothed image mask from the original image so that the resultant subtracted image may be displayed. Because the image has been scaled by logarithmic scaler 254 for convenience, after processing by subtractor 258 the image must be returned to linear scaling by antilog scaler 26. Any further non-linear scaling, such as normally provided by non-linear scaling system 59 shown in FIG. 4, may now be provided in a subsequent processing step by non-linear scaling system 61.

As noted above the logarithmically scaled image output from logarithmic scaler 254 is also applied to the input of saturable resistive grid 200 as described in detail with regard to FIG. 11 above. Saturable resistive grid 200 must be properly adjusted so that segmentation, that is, saturation of the lateral element FET pair 205 between nodes on either side of a large step change in image intensity, occurs substantially in accordance with the Rule of Twenty. In particular, as noted above, $V_{sat}$ for the lateral element FETs is moved by adjustment or setting of RBIAS so that intensities substantially greater than about a factor of twenty greater than the effective noise level of videocam 58 cause saturation and therefore segmentation to preserve the high frequency components in the smoothed image or mask.

The output of saturable resistive grid 200 must then be linearly scaled for subtraction from the unsmoothed signal so that the resultant image signal does not exceed the maximum allowable signal that can be applied to monitor 60. Peak or maximum detector 256 is used to compare the maximum signal value of the logarithmically scaled image output from logarithmic scaler 254 with a properly scaled maximum allowable signal value, $V_{max}$. In the example being described, $V_{max}$ would be the log of 0.9 volts. The output of maximum detector 256 is compared in error detector 264 with $V_{max}$ to determine a feedback error signal applied through comparator 266 to multiplier 268.

Multiplier 268 adjusts the output of saturable resistive grid 200 in accordance with the factor provided by error detector 264 and applies the adjusted output to subtractor 258. In addition, the output of multiplier 268 is also applied to maximum detector 270 and minimum detector 272 so that the differential value of the smoothed image signal intensity may be determined in comparator 274 and provided as the other input to comparator 266. In this manner, the output of saturable resistive grid 200 may be properly scaled so that it is exceeded by the unsmoothed image output of logarithmic scaler 254 by $V_{max}$. Therefore, after subtraction in subtractor 258, the maximum of the signal intensity of the image output applied to antilog scaler 260 is $V_{max}$.

Alternate smoothing and AGC techniques may be utilized with the scope of the present invention, but scaling the smoothed image mask to be subtracted from the unsmoothed image preserves the relative contrasts in each region more accurately than simply scaling the entire image. That is, the entire usable image signal is applied to non-linear scaling system 61 and or monitor 60 at the maximum allowable signal levels by subtracting a properly scaled mask. The relative contrast levels are therefore not distorted within regions but rather only at the edges of such regions which exceed intensity changes on the order predicted by the Rule of Twenty.

While this invention has been described with reference to its presently preferred embodiment(s), its scope is not limited thereto. Rather, such scope is only limited insofar as defined by the following set of claims and all equivalents thereof.

What is claimed is:

1. A method of image processing, comprising the steps of:
    applying points of a spectral component of an image to spatially related points in an analog smoothing grid;
    spatially weighting said spatially related points to form a corresponding spectral component mask, said spatial weighting being simultaneously applied in a linear manner for portions of such differences in image intensity between neighboring points in the spectral component below a predetermined level and in a non-linear manner for any portions of such differences above said predetermined level;
    forming a second, differently scaled, spectral component mask; and
    subtracting said spectral component masks from said image to form a composite image in which the maximum image intensity difference is within the dynamic range of an image utilization device responsive thereto.

2. The method of claim 1 further comprising the steps of:
    adjusting a transfer function of the linear spatial weighting; and
    separately adjusting the predetermined level.

3. The method of claim 1 further comprising the step of:
    selecting the predetermined level to reduce the effects of illumination of the image in the composite image.

4. The method of claim 1 further comprising the step of:
    selecting the predetermined level substantially in accordance with the rule of twenty.

5. The method of claim 1 further comprising the steps of:
    applying a logarithmic scale factor to the spectral component before said component is applied to the analog smoothing grid;
    selecting a fixed value of said difference in image intensity between neighboring points as the predetermined level; and
    applying an anti-logarithmic scale factor to the composite image before further processing or display.

6. The method of applying range compression to an image, comprising the steps of:
    applying an image to an analog resistive grid to generate a simultaneously segmented, spatially weighted image mask therefrom, the resistive grid being adjusted to cause image segmentation in response to differences in image intensities by weighting portions of said differences below a predetermined level in a first manner and by weighting any portions of said differences above that level in a second manner; and
    subtracting the image mask from the image to produce a composite image in which the differences between the image intensities is range compressed to within the dynamic range of an image utilization device related thereto.

7. The method of claim 6 wherein image segmentation results from saturation of elements of the grid.

8. The method of claim 7 wherein the grid is adjusted for image segmentation substantially in accordance with the rule of twenty.

9. The method of claim 6 further comprising the step of:
    separately adjusting a transfer function of said spatial weighting.

10. Apparatus for image processing, comprising:
    analog smoothing grid means for linearly spatially weighting portions of applied image intensity differences below a predetermined difference level and simultaneously non-linearly spatially weighting applied image intensities above said predetermined difference level of a spectral component of an image applied to said analog smoothing grid to form a spectral component mask;
    means for forming another, differently scaled spectral component mask corresponding to a different spectral component of said image; and
    means for subtracting said spectral component masks from said image to form a composite image.

11. The invention of claim 10 further comprising:

means for adjusting a transfer function of the linear spatial weighting; and means for separately adjusting said predetermined level.

12. The invention of claim 10 further comprising:

means for selecting the predetermined level to reduce the effects of illumination of the image in the composite image.

13. The invention of claim 10 wherein said predetermined level is selected substantially in accordance with the rule of twenty.

14. The invention of claim 10 wherein said means for forming a differentially scaled spectral component mask further comprises:

means for applying a logarithmic scale factor to the spectral component before said component is applied to the analog smoothing grid; and means for applying an anti-logarithmic scale factor to the composite image before further processing or display.

* * * * *